US010632413B2

(12) United States Patent
Yin et al.

(10) Patent No.: US 10,632,413 B2
(45) Date of Patent: Apr. 28, 2020

(54) AUTOMATIC HIGH-SPEED ROTARY ATOMIZING DEVICE AND A FIRE EXTINGUISHING METHOD BY USING THE SAME

(71) Applicant: BEIJING CHINA SCIENCE ORGANIC INNOVATION LLC, Beijing (CN)

(72) Inventors: Yingwu Yin, Beijing (CN); Yanyan Zhao, Beijing (CN); Pengfei Wan, Beijing (CN); Yanqing Wu, Beijing (CN); Yonghua Lai, Beijing (CN); Kailin Sun, Beijing (CN); Yinghua Lu, Beijing (CN); Jiakui Sun, Beijing (CN); Yufen Zhao, Beijing (CN)

(73) Assignee: BEIJING CHINA SCIENCE ORGANIC INNOVATION LLC, Beijing (CN)

( * ) Notice: Subject to any disclaimer, the term of this patent is extended or adjusted under 35 U.S.C. 154(b) by 266 days.

(21) Appl. No.: 15/109,355

(22) PCT Filed: Dec. 26, 2014

(86) PCT No.: PCT/CN2014/095156
§ 371 (c)(1),
(2) Date: Aug. 24, 2016

(87) PCT Pub. No.: WO2015/101227
PCT Pub. Date: Jul. 9, 2015

(65) Prior Publication Data

US 2016/0367931 A1 Dec. 22, 2016

(30) Foreign Application Priority Data

Dec. 30, 2013 (CN) .......................... 2013 1 0740300
Dec. 30, 2013 (CN) .......................... 2013 1 0740307

(51) Int. Cl.
*B01D 47/08* (2006.01)
*A62C 31/05* (2006.01)
(Continued)

(52) U.S. Cl.
CPC .............. *B01D 47/08* (2013.01); *A62C 31/05* (2013.01); *A62C 99/0072* (2013.01);
(Continued)

(58) Field of Classification Search
CPC .. B01D 47/08; B01F 3/04028; B01F 3/04056; B01F 2215/0091; B05B 1/14;
(Continued)

(56) References Cited

U.S. PATENT DOCUMENTS 1,368,055 A * 2/1921 Reznicek ............ A62C 31/005 169/37
4,671,462 A 6/1987 Badria
(Continued)

FOREIGN PATENT DOCUMENTS

CN 101084069 A 12/2007
CN 101318165 A 12/2008
(Continued)

*Primary Examiner* — Stephen Hobson
(74) *Attorney, Agent, or Firm* — Novick, Kim & Lee, PLLC; Sang Ho Lee

(57) ABSTRACT

An automatic high-speed rotary atomizing device, comprising a rotary spray head with an upper portion and a lower portion, the upper portion is connected to pressurized fluid, the lower portion is connected to the upper portion by means of one or more spray nozzles (1, 3) or spray orifices via a bearing (56). The upper portion is stationary. When the pressurized fluid is sprayed out from the spray nozzle, part of kinetic energy of the pressurized fluid generates a counterforce that propels the entire lower portion of the spray head to rotate at a high speed, so as to convert most of the kinetic energy of the pressurized fluid into surface energy
(Continued)

1
3
2
56
10
14 that facilitates atomization of water flow when the pressurized fluid hits against a slanted surface or slit of the spray nozzle or passes through an aperture thereof, thereby forming a large-scale atomized, dispersed and swirling system. This automatic high-speed rotary atomizing device has low working pressure, high rotating speed, small and homogeneous fog droplets, and therefore can be widely used in fire extinguishing, flue gas purification, city purification, greenfield watering, landscape decoration, etc.

17 Claims, 10 Drawing Sheets

(51) Int. Cl.

| | |
|---|---|
| ***A62C 99/00*** | (2010.01) |
| ***B05B 3/06*** | (2006.01) |
| ***B05B 13/02*** | (2006.01) |
| ***B05B 1/14*** | (2006.01) |
| ***B01F 3/04*** | (2006.01) |
| ***B05B 3/12*** | (2006.01) |
| *B05B 13/06* | (2006.01) |

(52) U.S. Cl.
CPC ...... *B01F 3/04028* (2013.01); *B01F 3/04056* (2013.01); *B05B 1/14* (2013.01); *B05B 3/063* (2013.01); *B05B 3/12* (2013.01); *B05B 13/02* (2013.01); *B01F 2215/0091* (2013.01); *B05B 13/0636* (2013.01)

(58) Field of Classification Search
CPC ........... B05B 13/02; B05B 3/063; B05B 3/12; B05B 13/0636; A62C 99/0072; A62C 31/05
See application file for complete search history.

(56) References Cited

U.S. PATENT DOCUMENTS

| | | | | |
|---|---|---|---|---|
| 6,085,994 | A | 7/2000 | Zink | |
| 7,070,122 | B2 | 7/2006 | Burcham et al. | |
| 2011/0121099 | A1* | 5/2011 | Han ....................... | A62C 31/05 239/263 |

FOREIGN PATENT DOCUMENTS

| | | | |
|---|---|---|---|
| CN | 101829638 | A | 9/2010 |
| WO | 2006/024861 | A1 | 3/2006 |

* cited by examiner

AUTOMATIC HIGH-SPEED ROTARY ATOMIZING DEVICE AND A FIRE EXTINGUISHING METHOD BY USING THE SAME

TECHNICAL FIELD

The present invention relates to an atomizing device, in particular relates to a swirling atomizing device that generates high-speed swirling and atomization by the dynamic of the fluid itself so as to notably increase the process intensification effect, as well as use thereof and a fire extinguishing method by using the swirling atomizing device.

BACKGROUND OF THE INVENTION

The atomization technology is widely used in mass-transfer heat-transfer processes such as concentrating, drying, absorption, flue gas and air purification. Traditional atomization technology uses gas as a continuous phase and liquid as a discontinuous phase, and generates high-speed flow atomization by forcing pressurized fluid into spray nozzle pores, but such technology has many drawbacks such as larger loss of kinetic energy, poor atomization effect, easy clogging of the pores that are caused by frictional resistance generated when liquid passes through the pores. An improved atomization technology atomizes the pressurized fluid by centrifugation or pre-positioned spiral structure, but, although the problem of pore clogging is alleviated due to the large liquid flowing passage, there are still problems of scaling or clogging of the spiral nozzle, which negatively affects the atomization effect. These traditional or improved atomizing spray nozzles adopt the configuration with a stationary spray head where the fluid passes through a special structure to attain fast motion or dispersion by colliding, wherein most energy is absorbed by the structural component that is head-on collided with, so the distribution range and distribution effect of fluid in space as well as the duration and opportunity of gas-liquid contact are limited, which significantly influences the mass-transfer heat-transfer and reaction effect.

A centrifugation atomizing spray head consists of an atomizing plate, a swirling plate and a flow separating plate. Under certain pressure, the fluid passes through pores in the flow separating plate and converges into an annular groove, and then enters a swirling chamber of a swirling center along the tangential direction of the swirling plate, so as to generate high-speed rotating motion and be ejected from a central hole. By the action of centrifugal force, the fluid overcomes its own viscous force and surface tension, so as to be shattered into fine droplets and form a conic atomization area with a certain angle. However, this centrifugation atomizing spray head still has disadvantages such as uneven droplet distribution, small intermediate water amount, sprayed water with big water drops or water column, small covered area, poor atomization effect. Therefore, it is very worthwhile to develop a new high-efficient atomizing spray head which converts the kinetic energy of pressurized fluid into the effective energy of sufficient atomization by "guidance according to trend".

By means of cyclone de-dusting and swirling liquid separation, an effective dust and fog elimination process may be achieved. Similarly, by completely relying on the initial kinetic energy of the fluid entering the tower, swirling motion is generated when the fluid enters a cylindrical body along its tangential direction from an inlet pipe and changes moving direction upon being blocked. Although the generated centrifugal force brings dust and/or droplets with larger density towards the surrounding wall so as to achieve preliminary gas-liquid separation or gas-solid separation, the cyclone de-dusting structure similarly causes that the kinetic energy of the fluid is quickly absorbed by the equipment and thus only local swirling with limited effect is formed. As a result, the dust and fog elimination effect of the cyclone equipment is limited, and its processing effect still needs to be improved. Although the flow velocity of the fluid can be increased by adding more blowing and discharging equipment, the energy loss would be significantly increased, and the increase of gas flow velocity would negatively affect the desulfurization effect. Currently, dust such as PM10 and PM2.5 in flue gas must be treated with bag filter de-dusting or electrostatic de-dusting to be mostly eliminated so as to meet the discharge standard.

De-dusting and desulfurization by water spray is a most common means for purifying the flue gas. Wherein, by spraying dilute alkali water, the contaminants such as dust particles, sulfur dioxide and nitrogen oxide get into sufficient contact with water droplets or a water film in the air or on the filler surface so as to be captured, with a de-dusting efficiency of 80%-90% and the ability to eliminate harmful gas such as sulfur dioxide and nitrogen oxide. However, because of large gas amount, small water amount, poor dispersion of water droplets, short contact time and unsatisfactory phase contact effect, the above-mentioned problems of poor purification and contaminant elimination effect, high energy lost and processing cost still exist. As the sprayed water droplets do not form liquid swirling and cannot drive gas swirling, under the dual action of gravity and initial kinetic energy, the liquid that has been sprayed downwards quickly falls onto the tower bottom or forms wall flow, and as a result, there is serious wall flow and wall sticking phenomenon and the mass-transfer heat-transfer effect still needs to be improved. Currently, in order to ensure the desulfurization effect, measures such as increasing the tower diameter, increasing the tower height, reducing gas velocity, adding multiple layers of spray heads are taken, which then leads to large investment, large space occupied by the equipment, high energy loss, poor processing effect, and especially that the coal-burning boiler tail gas after purification can hardly meet the sulfur dioxide and dust discharge standard of burning boilers. The largely discharged dust and acidic gas have already causes frequent, continuous and large-scale haze weather that severely influences people's normal life. Even if the tail gas meets the national discharge standard, it still actually is a major source that causes acid rain and haze. The measures currently taken, such as controlling coal using amount, removing coal-burning boilers from the downtown area, restricting use of cheap coal burned by boilers, using scarce natural gas as substitute fuel, cannot fundamentally solve the problem, but only add to the shortage of fuel gas and add to living cost of enterprises and civilians. Therefore, it has significant meaning to develop atomizing technology that has notable effect of high-efficiency and energy-saving.

Artificial raining is, choosing a proper timing according to physical characteristics of various cloud layers and spreading catalysts such as dry ice, silver iodide and salt powder in to the cloud with airplanes or rockets, so as to cause the cloud layer to rain or increase its raining amount, thereby relieving or alleviating farmland drought, increasing the irrigation water amount or water supply ability of water reservoirs, or increasing power generating water amount thereof.

Currently, artificial raining mainly uses methods such as cold cloud seeding, warm cloud seeding and dynamic seeding, and the applied catalysts are mainly dry ice, silver iodide and salt powder, which have problems such as large energy loss, harsh requirements of the climate cloud layer, and high cost.

Fire disaster is one of the most frequent and most common major disasters that threat the public safety. While utilization and control of fire is a symbol of human civilization progress, two important tasks of fire-fighting work are preventing fire disaster and reducing the damage of fire disaster, and therefore it is very worthwhile to develop the technology for effective fire disaster prevention as well as high-efficient and fast fire extinguishing. Combustion is an intensive exothermic chemical oxidation reaction that requires air participation, and thus fire extinguishing is a process of quickly stopping combustion by means of isolating and diluting air, covering the burning area, reducing the temperature, or combination thereof. When extinguishing initial small fire or extinguishing fire of small amount of oil, the fire is often covered by fine river sand; flame or small fire at a container mouth can be extinguished by directly covering the fire with an asbestos quilt or a wet cotton quilt; the foam fire-extinguisher used at home can extinguish initial small fire, it uses aluminum sulfate and sodium bicarbonate as fire-extinguishing fluid which, when mixed by inverting the extinguisher during usage, react to produce a gas-liquid-solid mixture of aluminum, water and carbon dioxide that can be directly sprayed to cover the flame and inflamer so as to achieve the purpose of reducing the temperature and isolating the air; fires in places such as precision instrument, electrical equipment, oil tank area, storage, oil pump room, oil operation room are often extinguished by carbon dioxide fire-extinguishers or carbon dioxide powder fire-extinguishers. However, if a small fire cannot be quickly extinguished, it usually evolve into a big and fierce fire and at that point the aforementioned means cannot take effect, then large fire-fighting equipment such as a fire-fighting lance and a fire-fighting truck must be used to extinguish the big fire. Thus, if initial fire cannot be extinguished quickly and effectively, the best opportunity to fight the fire will be missed and a major disaster might be caused.

As described above, the fire extinguishing methods in prior art actually use measures such as reducing the temperature or oxygen concentration or contact thereof so as to achieve the purpose of terminating the oxidation reaction and extinguishing the flame. However, the fire extinguishing methods in prior art have the problems of uneven dispersion of the fire-extinguishing solid and liquid, large use amount of the fire-extinguishing agent, poor fire-extinguishing effect, severe damage of property, high cost of use, small fire-extinguishing area, and inability to effectively eliminate toxic smoke.

When the fire-extinguishing process is analyzed according to principle of chemical engineering, the currently used various fire-fighting equipment and apparatuses do not perform atomization and dispersing of the fire-extinguishing agent very well, and their fire-extinguishing processes have poor mass-transfer heat-transfer performance. Although the water-type fire-fighting apparatus have large water pressure and water amount, its atomization effect is poor, its spray area is small, its water use amount is large, and because the water can hardly vaporize effectively to absorb heat and dilute air at the moment when coming into contact with the flame, large amount of water get lost instantly, which leads to a situation that "a truckload of water cannot extinguish a fire". If the fire cannot be extinguished in time, serious damage of property will be caused, and the large amount of toxic gas and PM2.5 produced by burning usually result in significant casualty and social panic.

In order to enhance the fire-extinguishing effect, some improvement of water flow dispersion is made to the spray head in prior art. Water sprinkler with a simple structure that is often used indoor only disperse the water flow into water drops by means of a water splashing deflector, wherein no fine water fog is produced, and although the water spray area is notably increased as compared to direct water ejection, its covering area is not enough, its distribution is uneven, its intermediate water amount is small, the water has extremely big drops or is in a state of water column, and thus the fire-extinguishing effect is unsatisfactory. The fire-fighting lance that is often used for fire-extinguishing has reduced outlet diameter and increased outflow velocity, so that water is splashed onto an object to generate atomization, with most of the kinetic energy being absorbed by the object that water is splashed onto, and as affected by the field environment, the distance and the inflamer shape, its effect is limited, it has small covering area and poor atomization effect, and it cannot suppress the flame in a short time, which leads to very poor water utilization rate and rather poor fire-extinguishing efficiency. Some high-pressure fine-water-fog spray heads may have better atomization effect, but requires a pressure of about 10 MPa, which might easily causes personal injury or property damage, have very high cost, and thus can hardly be popularized. In order to assist the atomization, a specific mechanical structure such as a rotary core, a barrier block or a spiral spring is added into the spray head in prior art, wherein the rotary core type of spray head is the most common atomizing spray head, and its working principle is that the fluid driven by pressure enters a swirling chamber and generates intense rotating motion so as to be ejected from a spray head, thereby achieving atomization by the action of centrifugal force, however, when used for fire-extinguishing, it has the following problems:

(1) Such a rotary core structure or ejection atomizing apparatus has a "mechanical obstruction" function towards the fluid, which causes that most kinetic energy of the fluid is absorbed by the spray head body, and therefore, the fluid sprayed by the spray nozzle has a low sprayed, covers a short distance, can hardly get close to the flame, thus being unable to effectively overcome the airflow resistance of the flame, unable to reach the flame interior and burning surface to perform fire-extinguishing, and unable to sufficiently exert the function of covering the burning surface and reducing temperature thereof. The spray protection radius of each spray nozzle is normally about 0.5 m, and multiple spray nozzles, which add to the cost, can hardly enhance the effect.

(2) Atomization assisted by centrifugal force forms a hollow cone, which causes uneven distribution of the spray density, and thus the function of high-efficient fire smothering by fine water fog cannot be sufficiently exerted. Using a barrier block or a spiral spring would similarly causes that most kinetic energy is absorbed and that the water drops produced by the atomizing spray head have large diameters. Therefore, it has significant meaning to develop a new device that can instantly extinguish big fire in a water-saving high-efficient way.

To sum up, sufficient liquid atomization has broad application demands, but has certain technical bottleneck that is challenging. The various stationary atomizing spray heads in prior art have large loss of kinetic energy and unsatisfactory atomization effect. Although there are spray heads that perform watering in a rotating manner, those spray heads have poor atomization effect due to their low rotating speed or un-optimized spray nozzle design, and thus are not applied in other fields. Although performing high-speed rotation with a motor can improve the dispersion effect, but this arrangement still has many problems such as high cost, complicated structure, large energy loss, limited usable range, thus being difficult to popularize. Therefore, it has important meaning to develop an atomizing device that can be widely applied in industrial and agricultural fields such as fluid atomization, flue gas and air purification, spray drying or concentrating, smoke abatement and fire extinguishing.

SUMMARY OF THE INVENTION

In order to solve the problem in prior art that various stationary atomizing spray heads have large loss of kinetic energy and unsatisfactory atomization effect, the present invention provides an automatic high-speed rotary atomizing device that has wide application range, little energy loss, and good atomization effect.

Therefore, the Present Application Adopts the Following Technical Solution:

An automatic high-speed rotary atomizing device, comprising a rotary spray head, wherein, the rotary spray head comprises an upper portion connected to pressurized fluid and a lower portion connected to the upper portion by means of one or more spray nozzles or spray orifices via a bearing; the upper portion is stationary; when the pressurized fluid is sprayed out from the spray nozzle, part of kinetic energy of the fluid generates a counterforce that propels the entire lower portion of the spray head to rotate at a high speed, so as to convert most of the kinetic energy of the fluid into surface energy that facilitates atomization of water flow when the pressurized fluid hits against a slanted surface or slit of the spray nozzle or passes through an aperture thereof, thereby forming a large-scale atomized, dispersed and swirling system.

In the above-mentioned automatic high-speed rotary atomizing device, the upper portion and the lower portion is connected via a bearing.

In the above-mentioned automatic high-speed rotary atomizing device, the rotary spray head comprises a spray nozzle, a rotary head, a bearing, a pipe joint, a fastener and a locating piece connected in sequence, the spray nozzle is fixed to the rotary head, the rotary head is connected to the bearing and the spray nozzle, the bearing is connected to the pipe joint, and the locating piece is arranged to locate the bearing in both the axial direction and the radial direction; the spray nozzle and the rotary head are disposed on the lower portion, and the pipe joint is disposed on the upper portion.

In the above-mentioned automatic high-speed rotary atomizing device, the rotary spray head is connected to a fan blade or an impeller blade or a paddle blade.

In the above-mentioned automatic high-speed rotary atomizing device, the fan blade or impeller blade or paddle blade is provided with micro apertures.

In the above-mentioned automatic high-speed rotary atomizing device, the rotary head is in threaded or welded connection with the bearing and the spray nozzle; the rotary head is provided with a flow passage bore therein and one or more openings or screw holes for being connected to the spray nozzle; the bearing consists of one or more deep groove ball bearings, or the bearing consists of one or more deep groove ball bearings and axial thrust bearings.

In the above-mentioned automatic high-speed rotary atomizing device, the rotary spray head has a bullet shape, an olive shape, a round shape, a rectangular shape, a long column shape or a transverse tubular shape; the spray nozzle consists of one or more nozzles for providing rotation, or consists of one or more nozzles for providing rotation and one or more top nozzles.

In the above-mentioned automatic high-speed rotary atomizing device, the sum of aperture areas does not exceed the cross-sectional area of the pipe, wherein, the sum of aperture areas refers to the sum of aperture areas of the spray nozzles or spray orifices, and the pipe refers to the pipe joint, i.e. the sum of aperture areas of the spray nozzles or spray orifices does not exceed the cross-sectional area of the pipe joint inlet.

In the above-mentioned automatic high-speed rotary atomizing device, the spray nozzle is a fine-pored spray nozzle, an atomizing nozzle, a small-flow jet nozzle or combination thereof. When spraying fluid, the spray form of the fine-pored spray nozzle is spray from fine pores, i.e. fine spray, the spray form of the atomizing nozzle is atomized fluid, and the spray form of the small-flow jet nozzle is small flow.

In the above-mentioned automatic high-speed rotary atomizing device, the rotary spray head is a three-nozzle jet flow rotary spray head, a three-nozzle jet flow double-needle atomizing spray head, a bullet-shaped multi-nozzle jet flow rotary spray head, a three-nozzle jet flow 45°-nozzle-angle double-needle atomizing spray head, a three-nozzle jet flow 45°-nozzle-angle rotary spray head, or a three-nozzle jet flow double-needle 90°-nozzle-angle atomizing spray head. Wherein, 45°-nozzle-angle or 90°-nozzle-angle is a limitation towards the spray nozzles located on both lateral sides of the rotary head, 90°-nozzle-angle refers to that, when the fluid is ejected from the spray nozzles on both lateral sides of the rotary head, the intersection angle between the ejection direction of the fluid and the central axis direction of the rotary head is 90°, the fluid ejected in this manner can generate the largest torque; 45°-nozzle-angle refers to that, when the fluid is ejected from the spray nozzles on both lateral sides of the rotary head, the intersection angle between the ejection direction of the fluid and the central axis direction of the rotary head is 45°, the fluid ejected in this manner, on the premise that enough torque is ensured to be generated to propel the rotary spray head to rotate, can also generate a component of water flow in the direction of the central axis of the rotary head.

Use of the above-mentioned automatic high-speed rotary atomizing device, wherein, the rotary spray head is applied in a kettle, a tower or a tank individually or in combination, or the rotary spray head is connected on a pressurized fluid delivery pipe or a pressurized gas-water mixer, or the rotary spray head is positioned within a gas phase and/or a liquid phase.

In the above-mentioned use of automatic high-speed rotary atomizing device, the automatic high-speed rotary atomizing device is positioned in a swirling purification tower, with the rotary spray head arranged adjacent to the flue gas inlet at the tower bottom for upward spraying or arranged at the middle section of the swirling purification tower.

In the above-mentioned use of automatic high-speed rotary atomizing device, the rotary spray head is connected to a pump, a pressurized water storage container or pipeline to form a cooling humidification de-dusting apparatus, so as to perform local artificial intervention on the atmosphere to carry out atmospheric purification or artificial raining, to alleviate haze, and to eliminate smoke, dust and PM2.5 in a room, a yard, a residential district or a street.

A fire extinguishing method by using any of the above-mentioned automatic high-speed rotary atomizing device, wherein, the rotary spray head is connected on an indoor stationary automatic water-spray fire extinguishing system, a mobile fire-fighting lance outlet, a portable fire extinguisher, a running water pipe web, a water pump, a pressurized gas-water mixing container, or a pressurized fluid delivery pipe.

In the fire extinguishing method by using any of the above-mentioned automatic high-speed rotary atomizing device, the rotary spray head is a three-nozzle jet flow rotary spray head, a three-nozzle jet flow double-needle atomizing spray head, a three-nozzle jet flow 45°-nozzle-angle double-needle atomizing spray head, or a bullet-shaped multi-nozzle jet flow rotary spray head.

Compared to prior art, the present invention has the following advantages:

(1) The kinetic energy of pressurized fluid being ejected from a container or a pipeline has not been valued and well utilized in prior art. During research and development of high-efficient spray heads, it is found that, dividing the spray head into a stationary portion and another portion that uses spray nozzles to facilitate high-speed rotation, with the two portions connected via a bearing, which is a spray nozzle design of "guidance according to trend", not only converts the kinetic energy that has been ignored into rotation energy, but also effectively avoids loss of kinetic energy and convert the kinetic energy into surface energy that facilitates sufficient atomization to the greatest extent. This new rotary spray head is able to generate high-speed rotation by means of counterforce produced when the fluid is ejected outwards as well as the small resistance thereof, the rotating speed in liquid or air can reach hundreds to tens of thousands of rounds per minute, and the high-speed rotating air flow and liquid flow not only drives the surrounding gas and liquid to rotate, but also greatly facilitates friction between the dispersed fluid and the media, thereby enhancing the atomizing or dispersing effect. Adding swirl blades onto the rotary spray head can further enhance the swirling effect of the system. The three-nozzle jet flow rotary spray head or the bullet-shaped multi-nozzle jet flow spray head can overcome the disadvantages of the spray heads in prior art, and achieve long-distance wide-range sufficient atomization which covers a large area with more even distribution of the sprayed water in both the radial direction and the circumferential direction. By adjusting the orifice shape, size and angle of the central nozzle as well as adjusting the flow rate and water pressure, the swirling water fog can be sprayed to reach a distance of tens of meters and even reach farther in favorable wind. As for the rotary spray nozzles on both lateral sides, the counterforce generated by the ejected liquid at the curved surface can propel the spray nozzle to rotate at a high speed, so as to greatly extend the effective atomization area of the fog droplets. The atomization design and high-speed rotation of the central spray nozzle overcomes the hollowing out of the spray heads in prior art, increases the uniformity, more effectively ensures a wide range of coverage, and, more importantly, becomes a power source for large-scale, long-distance and continuous swirling, which exerts the "wind eye" effect like a tornado. By adjusting the horizontal angle of the rotary spray nozzle, changing the spray nozzle structure as well as the pressure and flow rate of the liquid, the water fog amount and distribution range can be easily controlled, so as to adapt to requirements under different circumstances.

(2) In the aspect of desulfurization and de-dusting, high-temperature hot flue gas that has not been treated by desulfurization and de-dusting is directed in to a purification tower with a swirling plate or in a manner of tangential feeding, the gas is driven to rotate along the horizontal tangential direction and rise spirally, which forms a first gas swirl with limited effect (the gas velocity is only increased by about one fold, being about 10 m/s). The utilization of atomizing rotary spray head or its combination with fan blades adjacent to the flue gas inlet can greatly intensify the swirling speed of the flue gas (the gas velocity is increased by about 3-5 folds, reaching about 35 m/s maximally). The circulating liquid that acquires momentum from a circulating pump generates a counterforce that propels the movable spray nozzle to rotate at a high speed when the liquid is ejected from the spray nozzle, and at the same time effectively drives the swirling of the gas flow, which proves that the atomizing rotary spray head is able to convert the fluid energy into kinetic energy that propels the spray nozzle and mass flow to rotate as well as surface energy that facilitates further dispersion of liquid droplets, which becomes a second swirl driving force. The atomizing spray head that can rotate at a high speed with a small flow rate is able to greatly increase the opportunity of gas-liquid contact in very short time, so as to cause the water fog to vaporize and thus rapidly reduce the temperature of the flue gas, thereby forming a negative pressure due to sudden reduction of volume, which generates a third swirl driving force. The combined forces of the kinetic energy of gas itself, the kinetic energy generated by rotation of liquid and the effective energy generated by volume contraction of gas itself facilitate a directional swirling motion of the fluid that is more intense, faster and has a larger effective range, with a fast swirling effect like a tornado, wherein the gas rises fast and spirally along the tower body and changes from an entire upward movement into a spiral rising movement, the rotary spray head exerts a tornado wind eye function that forms a negative pressure and facilitates swirling, which better converts the energy of the mass system itself into the effective energy, intensifies process mixing, and enhances the mass-transfer heat-transfer effect. The carried dust, sulfur dioxide and nitrogen dioxide driven by their own momentum and rotating force have more opportunity of sufficient contact reaction with the atomized weak alkali water suspending in the system or becoming captured by the alkali water. The humid environment and weak alkali water fog can significantly eliminate static electricity of the system, thereby enhancing the effect of capturing and precipitating the dust and harmful gas. The fast moving gas-liquid swirl fastens and facilitates the gathering of large-density dust and liquid towards the wall surface, which significantly enhances the smoke and dust elimination effect and greatly reduces entrainment. Furthermore, flue gas that is rich in water vapor would cool down to produce second water fog during the swirling and cooling process, which may assist in collecting and effectively removing the dust. Multiple towers connected in series, as well as rotary spray devices that are arranged at multiple locations and reasonably oriented in the up-and-down direction, can further ensure the effect. Other systems that have considerable volume contraction or pressure difference so as to cause the surrounding pressure to become higher than the central pressure and thus supplement gas continuously at a high flow rate can also induce large-scale long-distance intense swirl in the radial or axial direction that is similar to a tornado. The dust particles and liquid droplets entrained in the flue gas can be rapidly separated with the help of tens of times of centrifugal force, and the contaminants such as sulfur dioxide can also be captured by sufficient contact reaction with weak alkali water. The swirling purification tower with the core component of the swirling spray device can greatly enhance the processing amount of flue gas and the de-dusting desulfurization effect thereof, and make the coal-burning boiler meet and exceed the discharge standard of burning boilers (the discharge concentration of $SO_2$ and dust being lower than 50 $mg/m^3$), wherein the low-grade residual heat of the flue gas can be heat-exchanged by means of heat-exchanging jacket at the tower wall so as to be used for heat supply and refrigeration.

(3) In the aspect of artificial raining, the artificial raining in prior art uses catalysts such as dry ice, silver iodide and salt powder that must be spread with an airplane or launched with a rocket, which has high cost, harsh requirements of the cloud layer condition and unstable effect. The present invention only uses water, with a swirling atomization effect that has uniform distribution, long distance and large area of coverage, is able to induce rapid gathering of the water vapor that is scattered in the cloud layer, form local low pressure, and thus from rain by utilizing the energy of atmosphere itself, which has low cost and significant effect.

(4) In the aspect of high-efficient fire extinguishing application, as can be known by in-depth analysis of fire extinguishing process according to principle of chemical engineering, fire extinguishing by water spraying mainly utilizes the measures of reducing the temperature and expelling or diluting the oxygen to achieve the purpose of stopping the combustion reaction and extinguishing the flame. The surface area of atomized water is increased by tens of thousands of times, while the volume of vaporized water is increased by thousands of times. Therefore, sufficient atomization of water is the key to effectively increase the area of heat absorption and vaporization and thus generate rapid heat absorption, temperature reduction and high-efficient smothering effect. Therefore, a swirling atomizing device with an excellent atomization effect can rapidly reduce the temperature and oxygen concentration of a large-area fire scene, and at the same time the water vapor produced by instant massive heat absorption would expand sharply at the burning area, thereby attaining the effect of rapidly isolating and diluting air so as to quickly abate smoke and extinguish fire. The present invention well solves the key problem of even distribution, long-distance and large-area coverage for fast and high-efficient fire extinguishing. The structural characteristic of the rotary spray head is that the upper portion that is connected to water source is stationary, the lower portion has multiple spray nozzles and is connected with the upper portion via a bearing, when the pressurized fluid is sprayed out from the spray nozzle, part of kinetic energy of the fluid generates a counterforce that propels the entire lower portion of the spray head to rotate at a high speed, at the same time, when the pressurized fluid hits against a slanted surface or slit of the spray nozzle or passes through an aperture thereof, most of the kinetic energy of the fluid is not lost but effectively converted into surface energy that facilitates atomization of water flow. Such a device system that utilizes the counterforce of the pressurized fluid against the spray nozzle to propel the rotary portion of the spray head to rotate at a high speed is able to facilitate sufficient atomization and gas-liquid swirl formation, so as to attain process intensification and achieve the goal of high-efficient fire extinguishing. This new rotary spray head generates high-speed rotation by means of the counterforce acted on the rotary spray head with the bearing and produced when the fluid is ejected outwards, the rotating speed in gas or liquid medium can reach hundreds to tens of thousands of rounds per minute, and the high-speed rotating air flow and liquid flow can drive the surrounding gas and liquid to generate rotating flow. The results of experiments indicate that, the compact structure of three-nozzle jet flow rotary spray head or bullet-shaped multi-nozzle jet flow spray head can overcome the disadvantages of the spray heads in prior art, and achieve long-distance wide-range sufficient atomization which covers a large area. By adjusting the orifice size and angle of the central nozzle as well as adjusting the flow rate and water pressure, the water fog can effectively reach the burning surface even form a distance of tens of meters, with even better effect in favorable wind. The momentum of the rotary spray nozzles on both lateral sides that is generated when the liquid is being ejected is able to propel the three nozzles to rotate at a high speed, thereby greatly expanding the effective atomization area and effectively ensuring wide-range uniform coverage. In addition, by adjusting the horizontal angle of the rotary spray nozzle, changing the spray nozzle structure as well as the pressure and flow rate of the liquid, the water fog amount and distribution range can be easily controlled, so as to adapt to fire extinguishing requirements under different circumstances.

Further experiment results indicate that, even connected to tap water, this series of high-efficient rotary atomizing spray heads can also have good rotary atomization effect. Under the 3-kilogram water pressure required for fire-fighting, they have better atomization effect, wherein the coverage diameter of up-and-down spray can reach 8 m-10 m, with more uniform distribution of upward spray; and the horizontal spray can reach a distance over 20 m and a width of 5 m-9 m.

According to the national fire extinguishing standard of automatic water spray fire-extinguishing system, downward water spray fire-extinguishing experiments, outdoor lateral fire-extinguishing experiments, as well as fire-extinguishing experiments with fire intensified by adding gasoline, are carried out, and the experiment results all indicate that the new swirling atomizing spray head series, especially the three-nozzle jet flow rotary spray head, the three-nozzle jet flow double-needle atomizing spray head and the bullet-shaped multi-nozzle jet flow rotary spray head, can achieve the amazing effect of instantly eliminating the black smoke, suppressing the flame in seconds and extinguishing the fire within ten seconds, which has particular better effect for extinguishing big fire. They are able to rapidly reduce the temperature and abate the smoke, suppress big fire from a long distance and quickly get close to the ignition source, which is more suitable for large-scale fast fire-extinguishing. The experiments indicate that this series of atomizing spray heads also have amazing effect for extinguishing gasoline fire, wherein the sufficiently atomized water fog hangs over the flame to rapidly isolate the air, thereby extinguishing fire of 1 L gasoline within ten to twenty seconds. The present invention is a significant technology innovation in the field of fire-fighting, and is able to achieve the ideal goal of fast smoke abatement and fire extinguishing, high efficiency, safety and environmental protection, convenient usage and water-saving.

BRIEF DESCRIPTION OF THE DRAWINGS

In order to make the subject matter of the present invention easy and clear to understand, hereinafter, the present invention will be further described in detail according to specific embodiments of the present invention and with reference to the appended drawings, wherein:

FIG. 22-1 shows a structure of a watering spray head in prior art;

FIG. 22-2 shows a structure of a water fog spray head in prior art;

FIG. 22-3 shows a single-nozzle spiral spray head in prior art;

FIG. 22-4 shows a three-nozzle spiral spray head in prior art;

Figure 1:
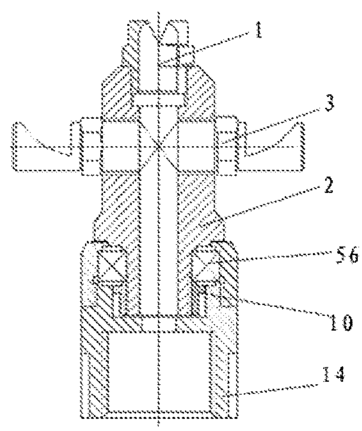
FIG. 1 shows a preferable structure of a three-nozzle jet flow 90°-nozzle-angle rotary spray head with a single bearing.

Wherein, the reference numerals in the drawing are explained as follows: 1—fan-shaped spray nozzle, 2—rotary head, 3—wide-angle fan-shaped spray nozzle, 4—clamp spring, 5—deep groove ball bearing, 6—thrust bearing, 56—bearing, 7—distance sleeve for bearing, 8—bearing seat, 9—screw bolt, 10—lock nut, 11—sealing sleeve, 12—connecting nut for pipe joint, 13—fan blade, 14—pipe joint, 15—bearing jacket, 100—fringe point, 200—half center point, 300—center point.

DETAILED DESCRIPTION OF EMBODIMENTS

The present invention can be further understood by reading the following embodiments of the present invention. The following embodiments are merely several specific embodiments of the present invention, and the scope of the present invention is not limited to these embodiments. Implementation of the present invention by using its method or technical solution with unessential modification should be considered to constitute infringement of the protection scope of the present invention. In the following embodiments, the spray heads are all rotary spray heads with a design parameter of 3 m/h flow rate under 0.3 Mpa (3-kilogram) pressure, wherein the wide-angle fan-shaped spray nozzle has a spray angle of 75°, the fan-shaped spray nozzle has a spray angle of 60°, and the nozzles have a main flow passage with a diameter of 2 mm.

I. Test of Rotating Speed and Flow Rate of the Rotary Spray Heads Under Different Pressure

Figure 16:
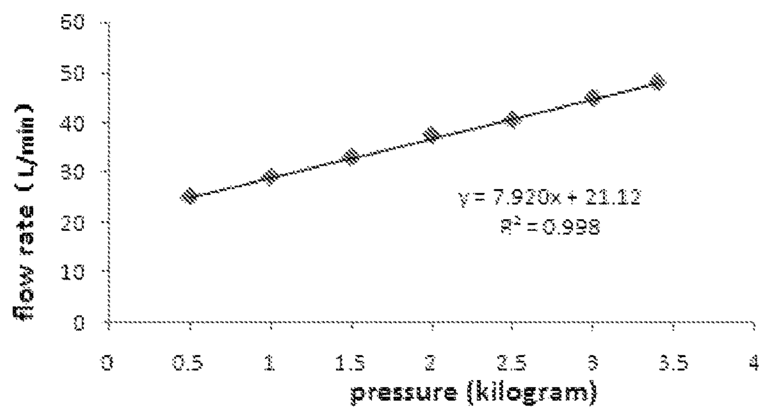
FIG. 16 shows flow rate under different pressure of the three-nozzle jet flow rotary spray head.

Embodiment 1: Flow Rate of the Three-Nozzle Jet Flow Rotary Spray Heads Under Different Pressure A three-nozzle jet flow rotary spray head is mounted onto an experiment apparatus with a pressure gauge and a water pump, and tap water is used for experiments, with the nozzle mouth water pressure being 0.05 MPa, 0.10 MPa, 0.15 MPa, 0.20 MPa, 0.25 MPa, 0.30 MPa, and 0.35 MPa. The sprayed water is collected by a water tank and weighed by a weighing machine. The water spraying time for each time is 2 min, and flow rate of the spray head under different pressure is measured, as shown in FIG. 16.

The test results indicate that: there is a good linear relationship between the flow rate of the spray head and the pressure, so the flow rate can be adjusted according to requirements.

Embodiment 2: Rotating Speed of Different Spray Heads Under 3-Kilogram Pressure Different rotary spray heads are respectively mounted onto the experiment apparatus, and clean water is used for experiments. The rotating speed of different spray heads is measured under the same 3-kilogram water pressure. As shown in Table 1, the test results indicate that, under the same 3-kilogram water pressure, the various types of spray heads all have rotating speeds higher than 2000r/min, wherein the spiral atomizing rotary spray head has a lowest rotating speed of 2018r/min, and the three-nozzle jet flow rotary spray head has a highest rotating speed of 7991 r/min, while the three-nozzle jet flow double-needle atomizing spray head has the best stability.

TABLE 1

Rotating speed of different spray heads under 3-kilogram pressure

| Rotating speed/r/min | three-nozzle jet flow rotary spray head | three-nozzle jet flow 45°-nozzle-angle rotary spray head | three-nozzle jet flow double-needle atomizing spray head | spiral atomizing rotary spray head |
|---|---|---|---|---|
| maximum | 7991 | 5398 | 7765 | 3637 |
| minimum | 4780 | 2159 | 3114 | 2018 |
| real-time | 5531 | 4223 | 5342 | 2247 |

Embodiment 3: Rotating Speed in Air Medium of Different Spray Heads Fed with Air Air is fed into the spray heads, and the rotating speed of different spray heads is measured under different pressures in air medium. As shown in Table 2, the three-nozzle jet flow double-needle atomizing spray head has relatively higher rotating speed under 0.5-kilogram pressure, with a highest rotating speed of 11132 r/min; the spiral atomizing rotary spray head has relatively lower rotating speed under the same pressure.

TABLE 2

Rotating speed in air medium of different spray heads fed with air

| Rotating speed/r/min | | three-nozzle jet flow rotary spray head | three-nozzle jet flow 45°-nozzle-angle rotary spray head | three-nozzle jet flow double-needle atomizing spray head | spiral atomizing rotary spray head |
|---|---|---|---|---|---|
| 0.5 kg | maximum | 8231 | 7171 | 7967 | 5340 |
| | minimum | 11000 | 8363 | 11132 | 7707 |
| 1 kg | maximum | 11364 | 11069 | 5579 | 4334 |
| | minimum | 14409 | 11113 | 9902 | 8013 |

II. Test of Water Amount Distribution, Spray Radius and Farthest Spray Distance of the Spray Heads Under Different Conditions Embodiment 4: Radial Distribution of Sprayed Water Amount of Different Spray Heads when Spraying Upwards and Downwards The water amount distribution of the spray heads when spraying upwards and downwards is tested as follows: the spray head is positioned at a 2.5 m height above the ground, a row of water collecting tanks (S=0.08 $m^2$) are placed along the radial direction starting from a central point directly under the spray head, and after the spray head is kept on for 3 min under 3-kilogram pressure, the mass or volume of water collected in each water collecting tank at different distances from the spray head at the center (i.e. at different radial distances) is measured, so as to obtain test results of flow rate radial distribution conditions such as spray density, effective spray radius, and farthest spray distance, as shown in FIGS. 17-20.

Figure 23:
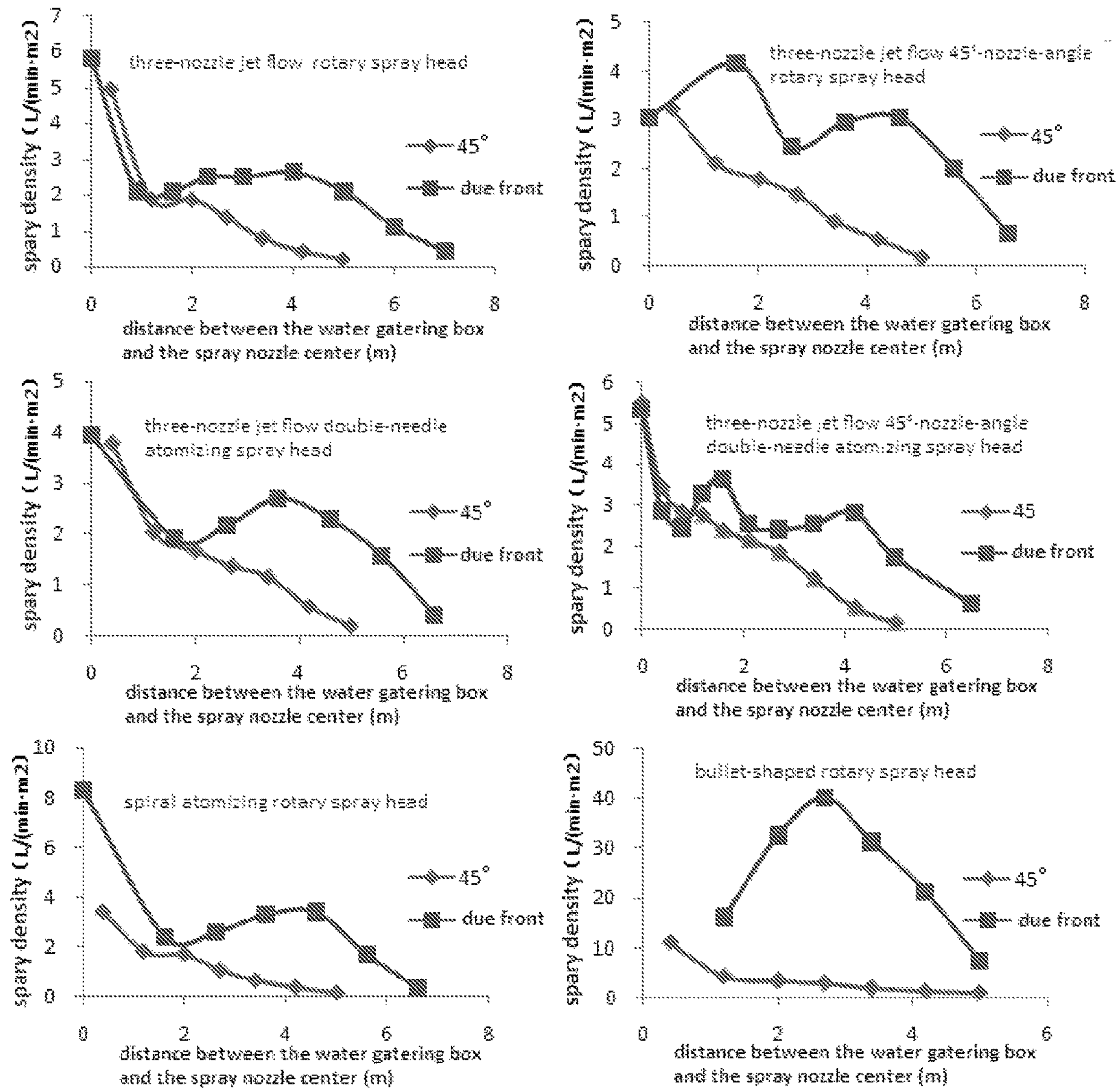
FIG. 23 shows distribution of sprayed water amount in the radial direction and in the 45° direction of various rotary spray heads when spraying horizontally under 3-kilogram pressure.

When spraying horizontally, the spray head is positioned at a 1 m height above the ground, a row of water collecting tanks (the size of each water collecting tank being S=0.08 $m^2$) are placed along a radial direction in due front of the spray head (due front), another row of water collecting tanks are placed along a radial direction that deviates form due front by a 45° angle) (45°, the spray head is kept on for 3 min under 3-kilogram pressure, and then the mass or volume of water collected in each water collecting tank is measured, so as to calculate the spray density at each water collecting tank. The test results thereof are shown in FIG. 23.

Figure 17:
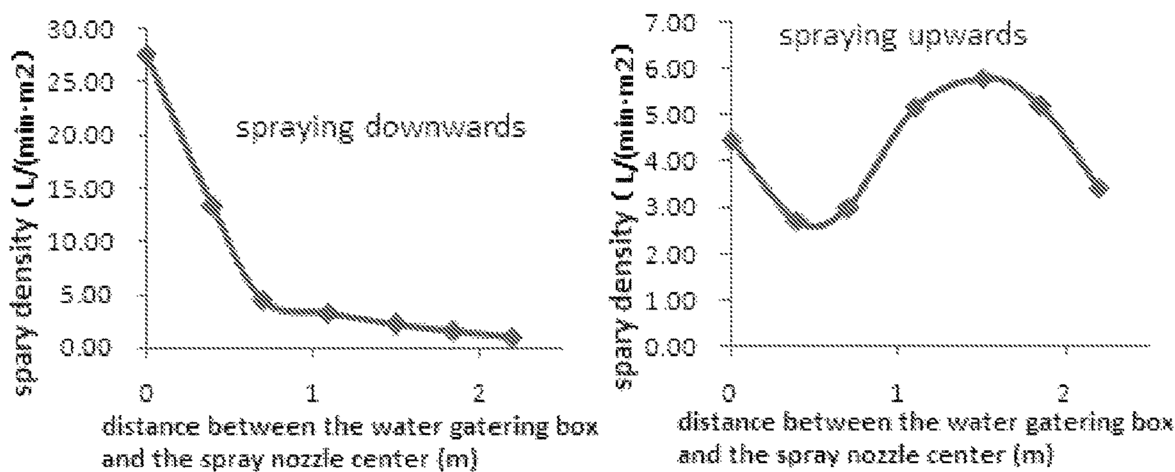
FIG. 17 shows radial distribution of sprayed water amount of the three-nozzle jet flow rotary spray head when spraying upwards and downwards under 3-kilogram pressure.

As shown in FIG. 17, the test results indicate that: the fog droplets sprayed by the three-nozzle jet flow 90°-nozzle-angle rotary spray head are mainly distributed within an area having a diameter of 2 m when spaying downwards, and the sprayed fog droplets can be distributed better within an area having a diameter of over 5 m when spaying upwards. Fire-extinguishing by spaying upwards can cover a larger range, with the maximum spray density at a diameter of about 3 m. Apparently, upward spraying can make the atomized water cover a larger range.

Figure 18:
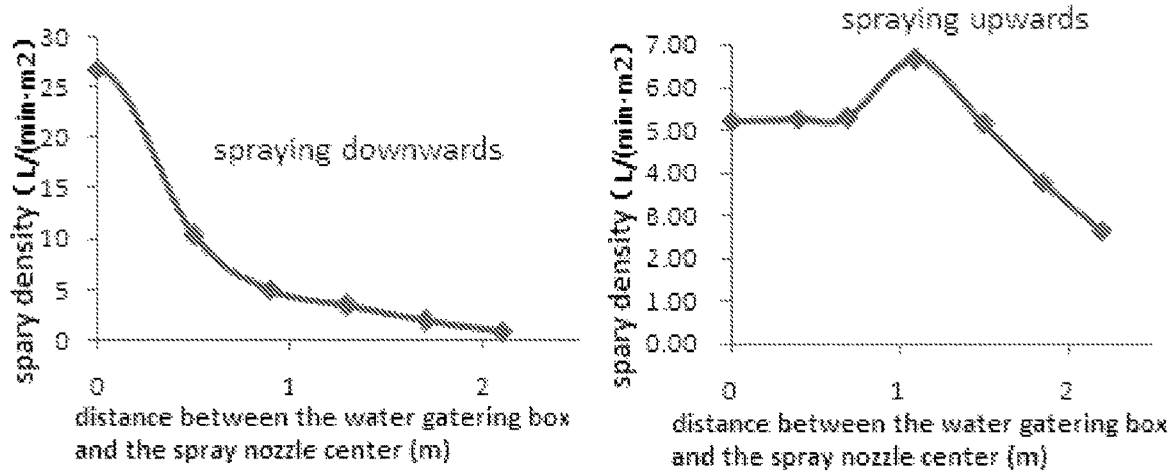
FIG. 18 shows radial distribution of sprayed water amount of the three-nozzle jet flow 45°-nozzle-angle rotary spray head when spraying upwards and downwards under 3-kilogram pressure.

As shown in FIG. 18, the test results indicate that: the fog droplets sprayed by the three-nozzle jet flow 45°-nozzle-angle rotary spray head are also mainly distributed within an area having a diameter of 2 m when spaying downwards, and the sprayed fog droplets can be distributed wider within an area having a diameter of about 4 m when spaying upwards. Apparently, for the three-nozzle jet flow 45°-nozzle-angle rotary spray head, upward spraying can cover a much larger range than downward spraying, with more uniform distribution.

Figure 19:
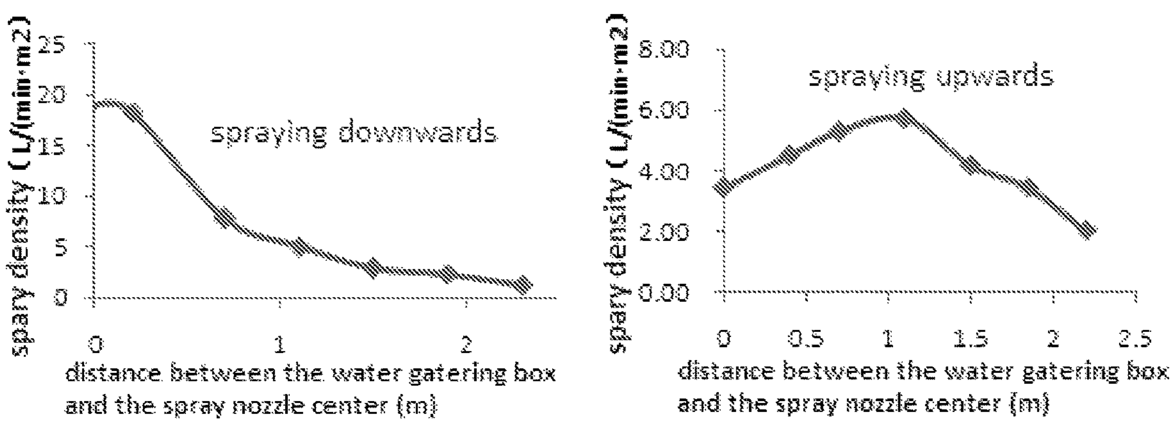
FIG. 19 shows radial distribution of sprayed water amount of the three-nozzle double-needle jet flow 90°-nozzle-angle rotary spray head when spraying upwards and downwards under 3-kilogram pressure.

As shown in FIG. 19, the test results indicate that: the dispersion characteristic of upwardly or downwardly sprayed fog droplets can be improved by using the three-nozzle double-needle jet flow 90°-nozzle-angle rotary spray head, wherein the fog droplets can reach an area having a diameter of about 5 m. The spray density within an area having a diameter of 5 m can be significantly increased when spaying upwards, and the maximum spray density appears at a diameter of about 2 m.

Figure 20:
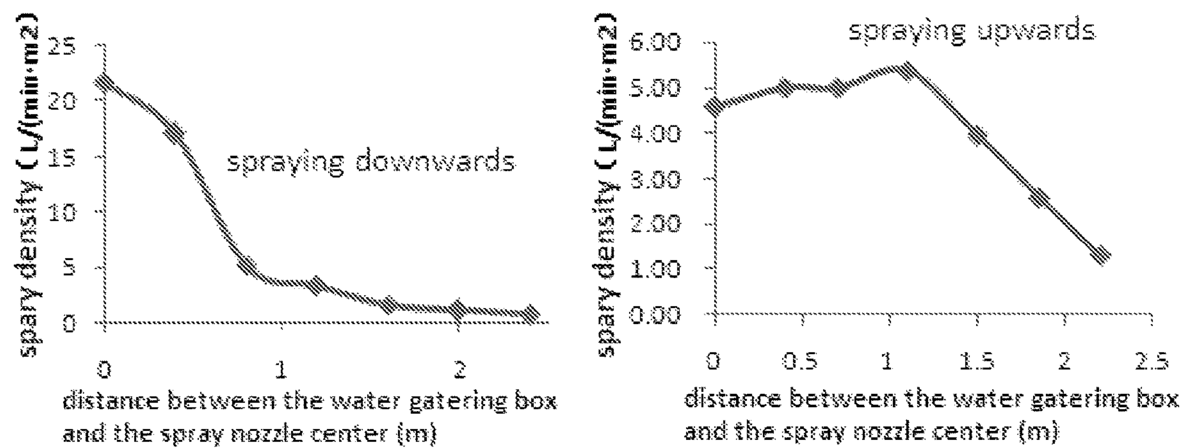
FIG. 20 shows radial distribution of sprayed water amount of the single-spiral composite spray head when spraying upwards and downwards under 3-kilogram pressure.

As shown in FIG. 20, the test results indicate that: the single-spiral composite spray head also has good dispersion characteristic of upwardly or downwardly sprayed fog droplets, wherein the fog droplets can reach an area having a diameter of about 3 m. The spray density within an area having a diameter of about 4 m can be significantly increased when spaying upwards, with uniform distribution in an area having a diameter of about 3 m.

As shown in FIG. 23, when spraying horizontally, the three-nozzle jet flow 90°-nozzle-angle rotary spray head has a maximum spray density at a distance of 4 m in the due front direction and has a maximum spray density at a distance of 2 m in the 45° direction, this spray head has an effective fire-extinguishing distance (spray density being over 1) of 6 m in the due front direction and has an effective fire-extinguishing distance of 3 m in the 45° direction. When spraying horizontally, the three-nozzle jet flow 45°-nozzle-angle rotary spray head has a maximum spray density at a distance of 1.5 m and another maximum spray density at a distance of 4.5 m in the due front direction, and its spray density decreases as the distance from the spray head gets farther in the 45° direction, thus it can be concluded that the spray is more concentrated towards the due front central direction with a 45° nozzle angle, this spray head has an effective fire-extinguishing distance (spray density being over 1) of 6.5 m in the due front direction and has an effective fire-extinguishing distance of 3.2 m in the 45° direction. When spraying horizontally, the three-nozzle jet flow double-needle 90°-nozzle-angle atomizing rotary spray head has a maximum spray density at a distance of 3.5 m in the due front direction, and its spray density decreases as the distance from the spray head gets farther in the 45° direction, this spray head has an effective fire-extinguishing distance (spray density being over 1) of 6 m in the due front direction and has an effective fire-extinguishing distance of 3.5 m in the 45° direction. If the two spray nozzles at both lateral sides of the three-nozzle jet flow double-needle atomizing rotary spray head have a 45° nozzle angle, such a spray head has maximum spray densities at a distance of 1.5 m and at a distance of 4.5 m in the due front direction, and its spray density decreases as the distance from the spray head gets farther in the 45° direction and in the horizontal direction, which is similar to the water distribution condition of the three-nozzle jet flow 45°-nozzle-angle rotary spray head, and this spray head has an effective fire-extinguishing distance (spray density being over 1) of 6 m in the due front direction, has an effective fire-extinguishing distance of 3.7 m in the 45° direction, and has an effective fire-extinguishing distance of 2 m in the horizontal direction. Wherein, if the two lateral spray nozzles have a 45° nozzle angle, the spray at both lateral sides is more concentrated and fills the gap between each lateral spray nozzle and the central nozzle, with more uniform water amount distribution. When spraying horizontally, the single-spiral composite rotary spray head has a maximum spray density at a distance of 4 m-5 m in the due front direction and has a maximum spray density at a distance of 2 m (excluding the first testing point) in the 45° direction, this spray head has an effective fire-extinguishing distance (spray density being over 1) of 6 m in the due front direction and has an effective fire-extinguishing distance of 2.8 m in the 45° direction. The bullet-shaped rotary spray head has relatively large sprayed water amount, and when spraying horizontally, this spray head has a maximum spray density at a distance of 2 m-3 m in the due front direction, and its spray density decreases as the distance from the spray head gets farther in the 45° direction, this spray head has an effective fire-extinguishing distance (spray density being over 1) over 5 m in the due front direction and has an effective fire-extinguishing distance of 4.8 m in the 45° direction.

Figure 24:
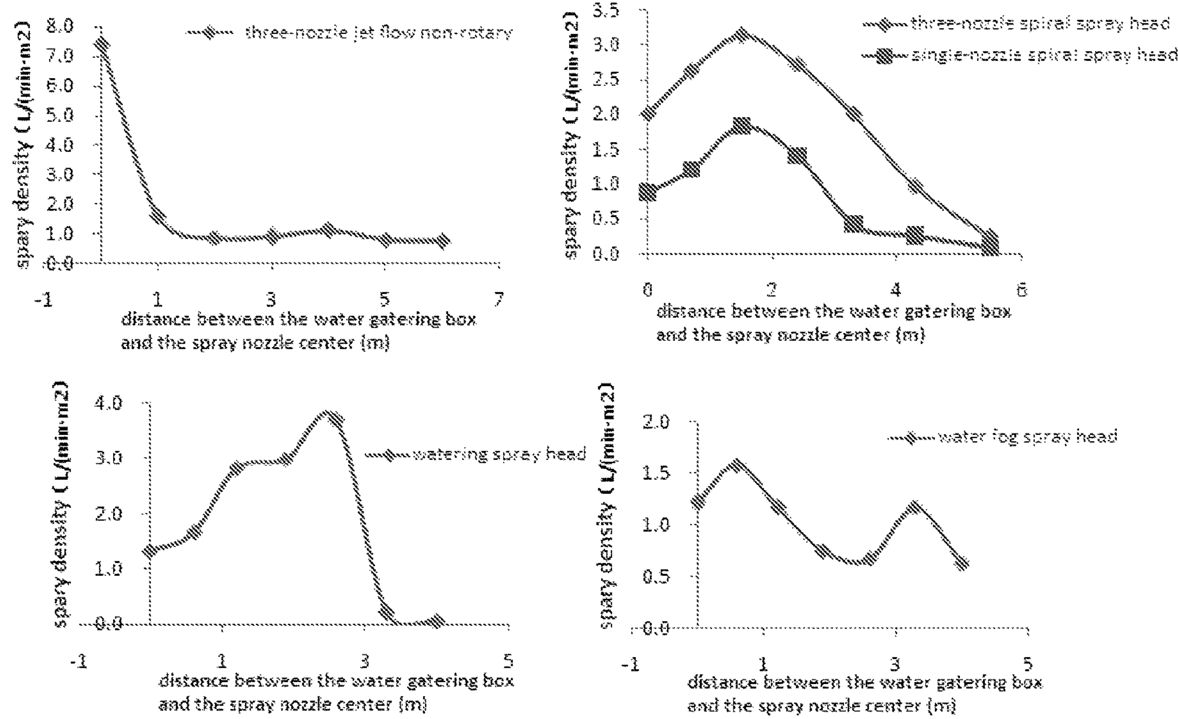
FIG. 24 shows radial distribution of sprayed water amount of the spray heads in prior art when spraying downwards under 3-kilogram pressure.

Test results of water amount distribution of the watering spray head, the water fog spray head, the single-nozzle spiral spray head, the three-nozzle spiral spray head, as well as the three-nozzle jet flow non-rotary spray head, are shown in FIG. 24.

The test results indicate that: the three-nozzle jet flow non-rotary spray head has a spray shape of water curtain and a relatively small spray range, and the radial water amount distribution under the water curtain is high in the center and decreases as the radial distance increases.

The water amount distribution conditions of the single-nozzle spiral spray head and the three-nozzle spiral spray head are similar. Among the three spiral spray nozzles, the central spray nozzle plays a major function, and the two lateral spiral spray nozzles has relatively small sprayed water amounts. Although they have better atomization effect, the spiral spray nozzles rely on the impact force and the friction force of the mechanical barrier, and thus there is hollowing phenomenon when spraying downwards. These spray heads have a maximum sprayed water amount at a distance of 1.5 m.

The watering spray head has less water amount at the center because it uses a water splashing deflector. This has a maximum sprayed water amount at a distance of 2.5 m, and after that, its sprayed water amount decreases sharply.

The water fog spray head has a barrier in the form of a rotary core structure positioned in the middle of the spray head, and has poor atomization effect. As can be seen from the figure, its spray density is small and uneven, is below 1.6, and cannot meet the fire-extinguishing requirement in most areas.

Figure 2:
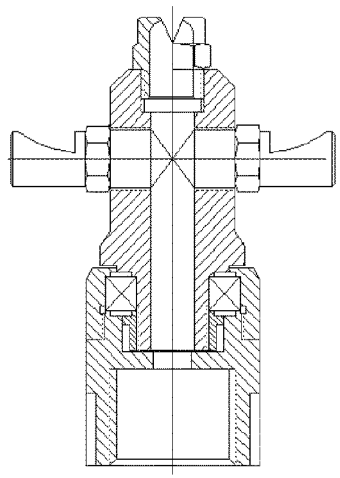
FIG. 2 shows a preferable structure of a three-nozzle jet flow 45°-nozzle-angle rotary spray head with a single bearing.
Figure 3:
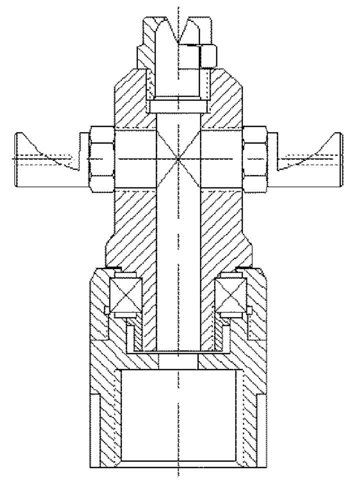
FIG. 3 shows a preferable structure of a three-nozzle jet flow double-needle atomizing spray head with a single bearing.
Figure 4:
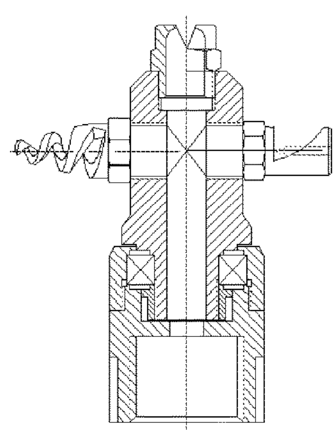
FIG. 4 shows a preferable structure of a spiral atomizing rotary spray head with a single bearing.
Figure 5:
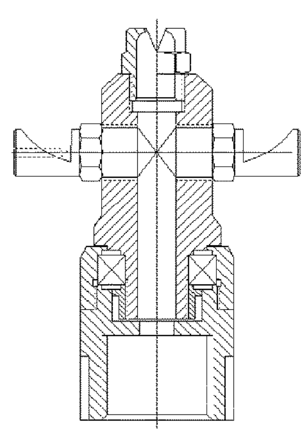
FIG. 5 shows a preferable structure of three-nozzle jet flow single-needle atomizing spray head.
Figure 6:
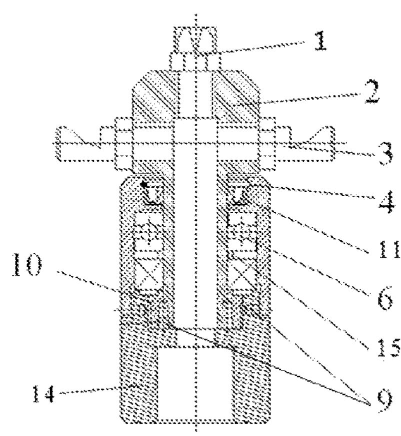
FIG. 6 shows a preferable structure of a three-nozzle jet flow rotary spray head with two bearings.
Figure 7:
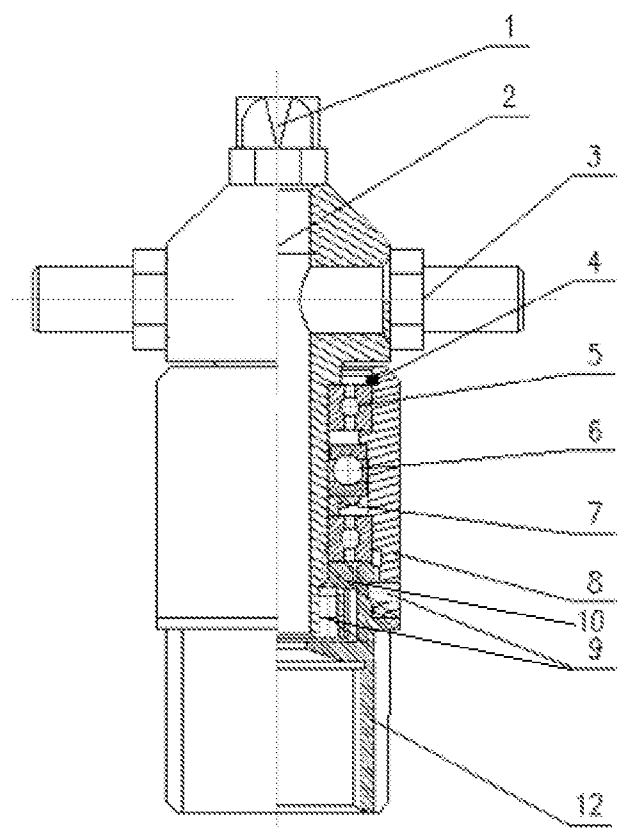
FIG. 7 shows a preferable structure of a three-nozzle jet flow rotary spray head with three bearings.
Figure 8:
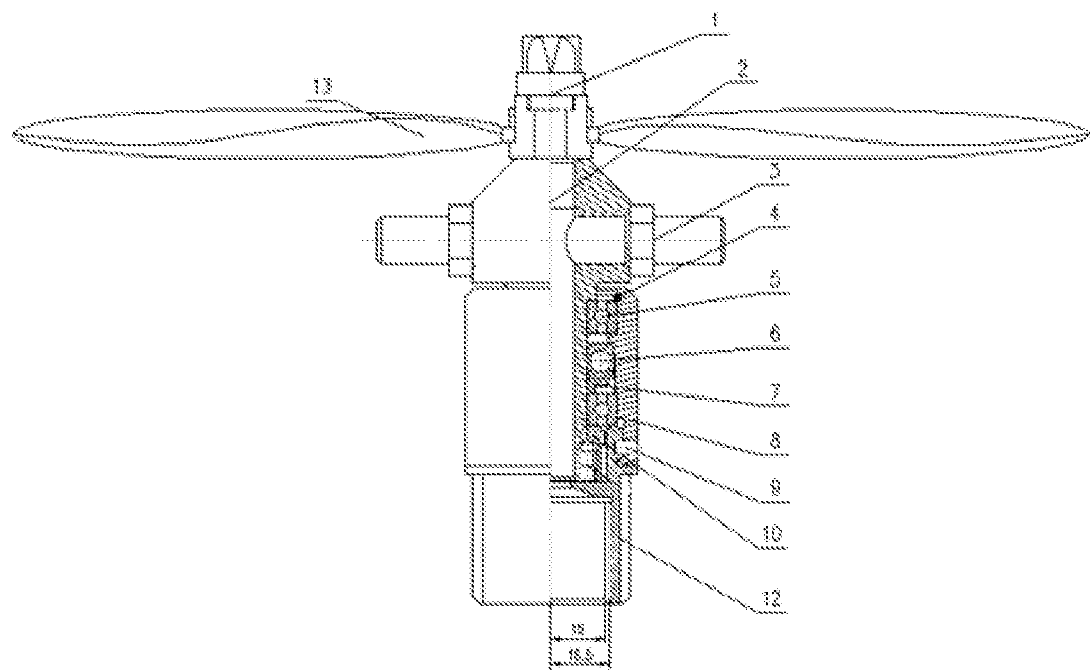
FIG. 8 shows a preferable structure of a three-nozzle jet flow rotary spray head with fan blades.
Figure 9:
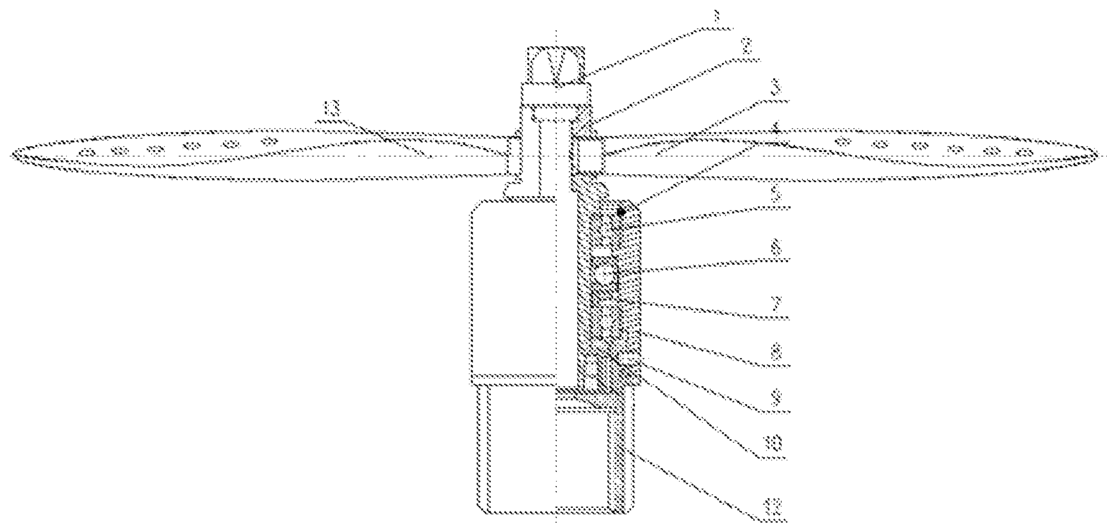
FIG. 9 shows another preferable structure of a three-nozzle jet flow rotary spray head with fan blades.
Figure 10:
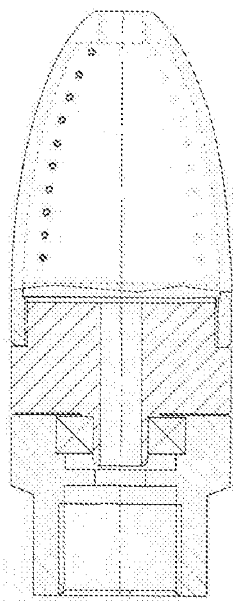
FIG. 10 shows a preferable structure of a bullet-shaped rotary spray head.
Figure 11:
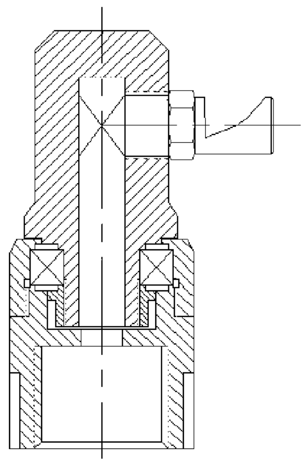
FIG. 11 shows a preferable structure of a single-arm single-nozzle rotary spray head.
Figure 12:
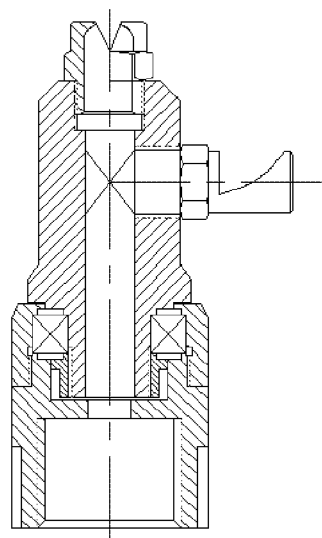
FIG. 12 shows a preferable structure of a single-arm double-nozzle rotary spray head.
Figure 13:
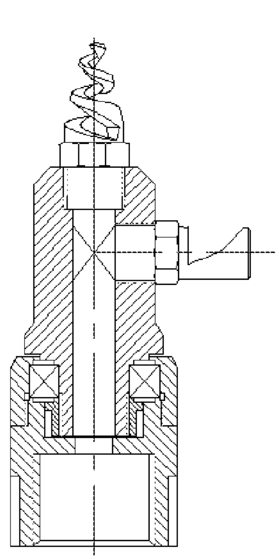
FIG. 13 shows a preferable structure of a single-arm double-nozzle single-spiral rotary spray head.
Figure 14:
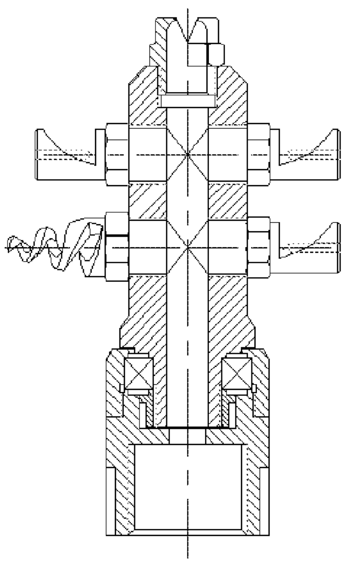
FIG. 14 shows a preferable structure of a double-layer multi-nozzle rotary spray head.
Figure 15:
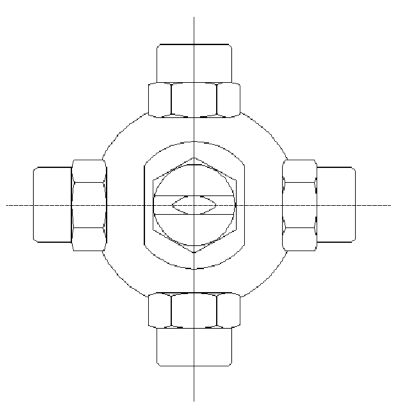
FIG. 15 shows a preferable structure of a four-nozzle rotary spray head.

Embodiment 5: Spray Radii and Farthest Spray Distances of Different Rotary Spray Heads Under Different Pressures and in Different Spray Statuses By using the experiment method as described in Embodiment 4, spray radii when spraying downwards, spray radii and spray heights when spraying upwards as well as spray widths and farthest spray distances when spraying laterally of the three-nozzle jet flow rotary spray head (FIG. 1), the three-nozzle jet flow 45°-nozzle-angle rotary spray head (FIG. 2), the spiral atomizing rotary spray head (FIG. 3), the three-nozzle jet flow single-needle atomizing spray head (FIG. 4) and the bullet-shaped rotary spray head (FIG. 10) under 2-kilogram pressure and under 3-kilogram pressure are measured. Meanwhile, by using the same method, spray radii when spraying downwards as well as spray widths and farthest spray distances when spraying laterally of the watering spray head and the water fog spray head currently on the market are measured. It can be seen that, when spraying upwards, downwards or laterally, the spray distances and ranges of the rotary spray heads are significantly larger than those of the spray heads in prior art, and especially, the spray distances when spraying upwards or laterally are farther, which satisfies the usage mode of most fire-extinguishing operations. The test results are listed in Table 3 and Table 4.

TABLE 3

Spray radii and farthest spray distances of different rotary spray heads under different pressures and in different spray statuses

| | | spray head type | | | | | | | | | |
|---|---|---|---|---|---|---|---|---|---|---|---|
| | | three-nozzle jet flow rotary spray head | | three-nozzle jet flow 45°-nozzle-angle rotary spray head | | spiral atomizing rotary spray head | | three-nozzle jet flow double-needle atomizing spray head | | bullet-shaped rotary spray head | |
| pressure (kilogram) | | 3 | 2 | 3 | 2 | 3 | 2 | 3 | 2 | 3 | 2 |
| spraying downwards spray radius (m) | | 5 | 3.8 | 3.2 | 2.8 | 5 | 3.8 | 3.5 | 3.2 | 4.25 | 3.5 |
| spraying upwards (m) | spray radius | 5 | 4 | 4 | 3.5 | 5 | 4 | 4.9 | 3.8 | — | — |
| | spray height | 4.5 | 3 | 5-6 | 3 | 4-5 | 3 | 4-5 | 3 | | |

TABLE 3-continued

Spray radii and farthest spray distances of different rotary spray heads under different pressures and in different spray statuses

| | | spray head type | | | | | | | | | |
|---|---|---|---|---|---|---|---|---|---|---|---|
| | | three-nozzle jet flow rotary spray head | | three-nozzle jet flow 45°-nozzle-angle rotary spray head | | spiral atomizing rotary spray head | | three-nozzle jet flow double-needle atomizing spray head | | bullet-shaped rotary spray head | |
| pressure (kilogram) | | 3 | 2 | 3 | 2 | 3 | 2 | 3 | 2 | 3 | 2 |
| spraying laterally (m) | spray width | 8.4 | 5.8 | 7.2 | 5.5 | 8.8 | 6 | 7.5 | 5.6 | 8.2 | 5.7 |
| | spray distance downwind | 21.7 | 14.1 | 21.8 | 13.8 | 20 | 12 | 20 | 13 | 4.7 | 4 |

TABLE 4

Spray radii and farthest spray distances of the rotary spray heads in prior art under different pressures and in different spray statuses

| | | spray head type | | | |
|---|---|---|---|---|---|
| | | watering spray head | | water fog spray head | |
| pressure (kilogram) | | 3 | 2 | 3 | 2 |
| spraying downwards spray radius (m) | | 2.9 | 1.7 | 3.1 | 2.7 |
| spraying laterally | spray width (m) | 3.3 | 1.8 | 6.2 | 2.3 |
| | spray distance (m) | 4.2 | 2.2 | 4 | 2.7 |

III. Evaluation of Gas Velocity in Tower and Desulfurization Effect of Flue Gas from Burning Boiler In order to further prove the effect of the swirling atomization technology in a confined space, test of gas velocity in tower and evaluation of sulfur dioxide elimination effect are performed in a boiler chimney (stainless steel tower) with a diameter of 1200 mm and a height of 10.5 m.

Figure 21:
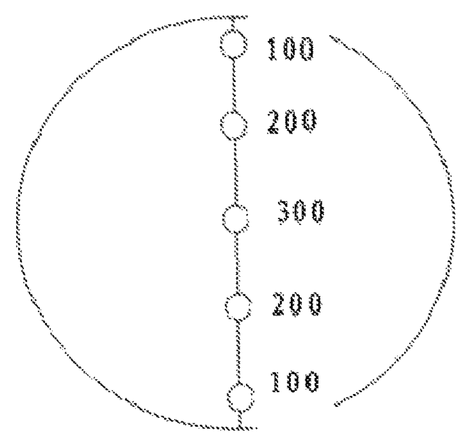
FIG. 21 is a schematic diagram of positions of wind speed testing points.
Figures 1, 22:
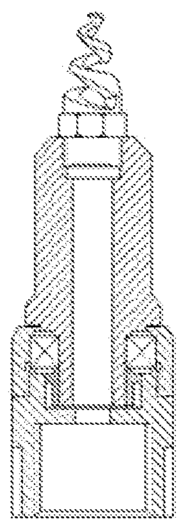
Figures 2, 22:
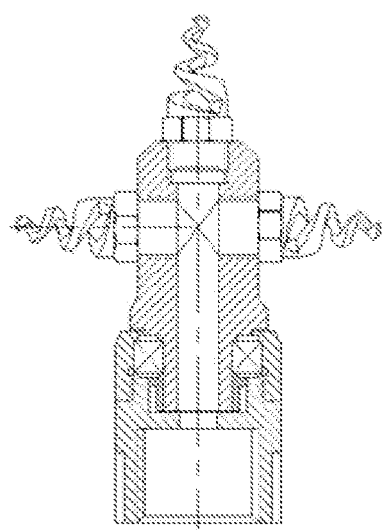
Figures 3, 22:
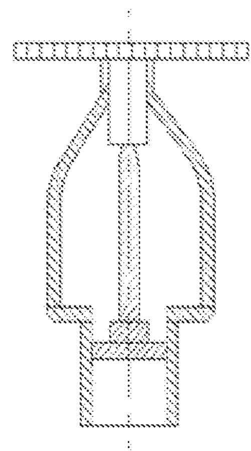
Figures 4, 22:
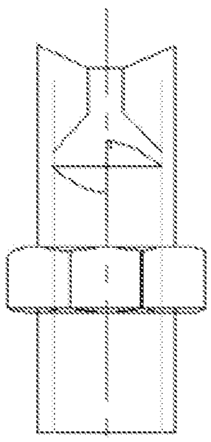

Embodiment 6: Test of Gas Velocity in Tower of Flue Gas from Burning Boiler (the Distribution of Testing Points in Tower is Shown in FIG. 21)

Experiment 1: no fuel gas is supplied, only the induced draft fan is turned on (rated load is 40 Hz, induced air amount is 51000-69000 $m^3$/h), the temperature in tower is 57° C. at tower top and 76° C. at tower bottom, thereby a blank experiment is conducted. The gas velocity in tower at different testing points is listed in Table 5. The tower has a diameter of 1.2 m and a height of 10 m.

TABLE 5

Gas velocity at different points in tower when only the induced draft fan is turned on

| | | testing point | | | | |
|---|---|---|---|---|---|---|
| | direction | 1 | 2 | 3 | 4 | 5 |
| tower top | up | 0 | 0 | 0 | 0 | 0 |
| | down | 8 | 6 | 8 | 7 | 7 |
| | left | 0 | 0 | 0 | 0 | 0 |
| | right | 0 | 0 | 0 | 0 | 0 |
| tower middle | up | 0 | 0 | 0 | 0 | 0 |
| | down | 6 | 7.5 | 10.5 | 8.5 | 6 |
| | left | 4.5 | 5.5 | 5.5 | 4.5 | 5.5 |
| | right | 5 | 5 | 4 | 3.5 | 4 |
| tower bottom | up | 4.5 | 0 | 6.5 | 0 | 0 |
| | down | 0 | 4.5 | 5.5 | 3.5 | 5 |
| | left | 4.5 | 0 | 0 | 4.5 | 7 |
| | right | 6 | 4.5 | 4 | 0 | 5 |

Experiment 2: the fuel gas is turned on, with a coal gas amount of 1176 $m^3$/h, both the blower (7600-15000 $m^3$/h) and the induced draft fan (40 Hz, induced air amount is 51000-69000 $m^3$/h) are turned on, the temperature in tower is 146° C. at tower top and 156° C. at tower bottom, the spray heads are not turned on, thereby another blank experiment is conducted. The gas velocity in tower at different testing points is listed in Table 6.

TABLE 6

Gas velocity at different points when the fuel gas and the blower are turned on without water spray

| | | testing point | | | | |
|---|---|---|---|---|---|---|
| | direction | 1 | 2 | 3 | 4 | 5 |
| tower top | up | 0 | 0 | 0 | 0 | 0 |
| | down | 5.5 | 4.5 | 5 | 5 | 6 |
| | left | 0 | 0 | 0 | 7 | 7.5 |
| | right | 6 | 4.5 | 0 | 0 | 0 |
| tower middle | up | 0 | 0 | 0 | 0 | 0 |
| | down | 6 | 4.5 | 0-3 | 5 | 6 |
| | left | 0 | 0 | 0 | 4.5 | 7.5 |
| | right | 4.5 | 5.5 | 0 | 0 | 0 |
| tower bottom | up | 2 | 0 | 2 | 0 | 2.5 |
| | down | 5.5 | 4.5 | 4.5 | 5 | 5 |
| | left | 3.5 | 4 | 5 | 6 | 9 |
| | right | 8 | 6 | 5 | 6 | 4 |

Experiment 3: the fuel gas is turned on, the middle and lower spray heads are turned on with a water spray flow rate of 5.7-7.5 $m^3$/h at the middle part and a water spray flow rate of 1.1-2.3 $m^3$/h at the lower part, both the blower and the induced draft fan are turned on, the temperature is 43° C. at both the upper and lower parts, and the fuel gas amount is 1138 $m^3$/h. The gas velocity in tower at different testing points is listed in Table 7.

TABLE 7

Gas velocity at different points when the fuel gas and the blower are turned on and when water is sprayed from the middle and lower spray heads

| | | testing point | | | | |
|---|---|---|---|---|---|---|
| | direction | 1 | 2 | 3 | 4 | 5 |
| tower top | up | 7 | 8.5 | 13 | 11.5 | 13 |
| | down | 24.5 | 10 | 14 | 14.5 | 19 |
| | left | 15 | 13.5 | 16.5 | 7.5 | 10 |
| | right | 8.5 | 11.5 | 11 | 12 | 6.5 |
| tower middle | up | 3.5 | 5.5 | 6 | 4.5 | 4 |
| | down | 12 | 14 | 15.5 | 24.5 | 19 |
| | left | 14.5 | 12 | 23 | 17.5 | 19 |
| | right | 18 | 10 | 12 | 12.5 | 12.5 |
| tower bottom | up | 13.5 | 19.5 | 10.5 | 21 | 14.5 |
| | down | 9 | 10 | 11.5 | 11 | 12 |
| | left | 9.5 | 9.5 | 21.5 | 17 | 18 |
| | right | 21.5 | 13.5 | 16.5 | 16 | 13 |

Experiment 4: fan blades are added onto the spray heads (the fan blades are made of ABS engineering plastics, have a number of 3 and a diameter of 375 mm), and the other conditions are the same as those of Experiment 3. The gas velocity in tower at different testing points is listed in Table 8.

TABLE 8

Gas velocity at different points when fan blades are added onto the spray heads

| | | testing point | | |
|---|---|---|---|---|
| | direction | 1 | 2 | 3 |
| tower top | up | 14.5 | 31.5 | 31.5 |
| | down | 17 | 21 | 21 |
| | left | 22.5 | 16.5 | 16.5 |
| | right | 28.5 | 21.5 | 12.5 |
| tower middle | up | 15.5 | 16.5 | 15.5 |
| | down | 10 | 12.5 | 10 |
| | left | 11.5 | 13.5 | 11.5 |
| | right | 20 | 22.5 | 20 |
| tower bottom | up | 12.5 | 12 | 12.5 |
| | down | 11 | 20 | 11 |
| | left | 9 | 12.5 | 9 |
| | right | 15.5 | 12.5 | 15.5 |

For the four different conditions of only turning on the induced draft fan, the fuel gas being further turned on, the spray heads being further turned on, and fan blades being added onto the spray heads, the gas velocity in different directions are sorted, as shown in Table 9 to Table 12.

TABLE 9

Gas velocity test results (downward direction)

| | tower top | | | | | tower middle | | | | | tower bottom | | | | |
|---|---|---|---|---|---|---|---|---|---|---|---|---|---|---|---|
| | B1 | B2 | B3 | B4 | B5 | M1 | M2 | M3 | M4 | M5 | T1 | T2 | T3 | T4 | T5 |
| only turning on the induced draft fan | 4.5 | 0 | 6.5 | 0 | 0 | 0 | 0 | 0 | 0 | 0 | 0 | 0 | 0 | 0 | 0 |
| the fuel gas being further turned on | 2 | 0 | 2 | 0 | 2.5 | 0 | 0 | 0 | 0 | 0 | 0 | 0 | 0 | 0 | 0 |
| the spray heads being further turned on | 13.5 | 19.5 | 10.5 | 21 | 14.5 | 3.5 | 5.5 | 6 | 4.5 | 4 | 7 | 8.5 | 13 | 11.5 | 13 |
| fan blades being added onto the spray heads | 14.5 | 31.5 | 31.5 | 14.5 | 31.5 | 15.5 | 16.5 | 15.5 | 15.5 | 16.5 | 12.5 | 12 | 12.5 | 12.5 | 12 |

TABLE 10

Gas velocity test results (upward direction)

| | tower top | | | | | tower middle | | | | | tower bottom | | | | |
|---|---|---|---|---|---|---|---|---|---|---|---|---|---|---|---|
| | B1 | B2 | B3 | B4 | B5 | M1 | M2 | M3 | M4 | M5 | T1 | T2 | T3 | T4 | T5 |
| only turning on the induced draft fan | 0 | 4.5 | 5.5 | 3.5 | 5 | 6 | 7.5 | 10.5 | 8.5 | 6 | 8 | 6 | 8 | 7 | 7 |
| the fuel gas being further turned on | 5.5 | 4.5 | 4.5 | 5 | 5 | 6 | 4.5 | 1.5 | 5 | 6 | 5.5 | 4.5 | 5 | 5 | 6 |
| the spray heads being further turned on | 9 | 10 | 11.5 | 11 | 12 | 12 | 14 | 15.5 | 24.5 | 19 | 24.5 | 10 | 14 | 14.5 | 19 |
| fan blades being added onto the spray heads | 17 | 21 | 21 | 17 | 21 | 10 | 12.5 | 10 | 10 | 12.5 | 11 | 20 | 11 | 11 | 20 |

TABLE 11

| Gas velocity test results (left direction) | | | | | | | | | | | | | | | |
|---|---|---|---|---|---|---|---|---|---|---|---|---|---|---|---|
| | tower top | | | | | tower middle | | | | | tower bottom | | | | |
| | B1 | B2 | B3 | B4 | B5 | M1 | M2 | M3 | M4 | M5 | T1 | T2 | T3 | T4 | T5 |
| only turning on the induced draft fan | 4.5 | 0 | 0 | 4.5 | 7 | 4.5 | 5.5 | 5.5 | 4.5 | 5.5 | 0 | 0 | 0 | 0 | 0 |
| the fuel gas being further turned on | 3.5 | 4 | 5 | 6 | 9 | 0 | 0 | 0 | 4.5 | 7.5 | 0 | 0 | 0 | 7 | 7.5 |
| the spray heads being further turned on | 9.5 | 9.5 | 21.5 | 17 | 18 | 14.5 | 12 | 23 | 17.5 | 19 | 15 | 13.5 | 16.5 | 7.5 | 10 |
| fan blades being added onto the spray heads | 22.5 | 16.5 | 16.5 | 22.5 | 16.5 | 11.5 | 13.5 | 11.5 | 11.5 | 13.5 | 9 | 12.5 | 9 | 9 | 12.5 |

TABLE 12

| Gas velocity test results (right direction) | | | | | | | | | | | | | | | |
|---|---|---|---|---|---|---|---|---|---|---|---|---|---|---|---|
| | tower top | | | | | tower middle | | | | | tower bottom | | | | |
| | B1 | B2 | B3 | B4 | B5 | M1 | M2 | M3 | M4 | M5 | T1 | T2 | T3 | T4 | T5 |
| only turning on the induced draft fan | 6 | 4.5 | 4 | 0 | 5 | 5 | 5 | 4 | 3.5 | 4 | 0 | 0 | 0 | 0 | 0 |
| the fuel gas being further turned on | 8 | 6 | 5 | 6 | 4 | 4.5 | 5.5 | 0 | 0 | 0 | 6 | 4.5 | 0 | 0 | 0 |
| the spray heads being further turned on | 21.5 | 13.5 | 16.5 | 16 | 13 | 18 | 10 | 12 | 12.5 | 12.5 | 8.5 | 11.5 | 11 | 12 | 6.5 |
| fan blades being added onto the spray heads | 28.5 | 21.5 | 12.5 | 28.5 | 21.5 | 20 | 22.5 | 20 | 20 | 22.5 | 15.5 | 12.5 | 15.5 | 15.5 | 12.5 |

It can be seen that, in the downward direction, the gas velocity when the spray heads are turned on is larger than the gas velocity when the spray heads are not turned on, which indicates greater turbulence of swirling gas. The gas velocity when fan blades are added onto the spray heads is larger than the gas velocity when fan blades are not added onto the spray heads and can reach 22.5 m/s maximally. The gas velocity in the right direction which is consistent with the swirling direction is larger than the gas velocity in the left direction, which further indicates the swirling effect.

Embodiment 7: Evaluation of De-Dusting Desulfurization Effect of Flue Gas from Coal-Burning Boiler De-dusting desulfurization experiment by dual alkali method is conducted, and the related conditions and test results are as follows: the flow rate of flue gas is 55000N·m$^3$/h, the flue gas temperature is 180° C., the inlet $SO_2$ concentration is 2000 mg/N·m$^3$, the tower has a diameter of 1.2 m and a height of 9 m, the liquid-gas ratio is 2/1000, the desulfurization liquid is a mixed solution of saturated lime water and 1% sodium hydroxide solution. Before revamping, the desulfurization efficiency is 90%, and the outlet sulfur dioxide content is 400 mg/N·m$^3$. After revamping, the desulfurization efficiency is around 99%, the outlet sulfur dioxide content is less than 50 mg/N·m$^3$, and the dust content can be reduced to 10 mg/N·m$^3$. These results fully prove that the swirling tower with the core component of the rotary spray heads can achieve high-efficient desulfurization and de-dusting, and render the discharge concentration of sulfur dioxide and dust of the purified flue gas from coal-burning boiler lower than the discharge standard threshold of burning boiler tail gas, which has significant meaning for haze control.

TABLE 13

| evaluation of de-dusting desulfurization effect of flue gas from coal-burning boiler | | | | | | | | | |
|---|---|---|---|---|---|---|---|---|---|
| | particulate matter test | | | | | | | | |
| | temperature data ° C. | | spray head flow rate | | | particulate matter calculation data | | | sulfur dioxide content |
| | tower | tower | m$^3$/h | | | mg/m$^3$ | | | tower top |
| Process type | top | bottom | upper | middle | lower | TSP | PM10 | PM2.5 | mg/m$^3$ |
| untreated flue gas | 97 | 94 | 0 | 0 | 0 | 40.5 | 33.2 | 19.2 | 4070 |
| dual alkali method pH > 13 | 46 | 46 | 0 | 3.8 | 2.1 | 8.865 | 8.835 | 7.275 | 64.19 |
| dual alkali method pH > 13 | 40 | 40 | 0 | 4.3 | 2.4 | 9.96 | 9.94 | 9.12 | 71.32 |

TABLE 13-continued evaluation of de-dusting desulfurization effect of flue gas from coal-burning boiler

| Process type | particulate matter test: temperature data ° C. tower top | tower bottom | spray head flow rate m$^3$/h upper | middle | lower | particulate matter calculation data mg/m$^3$ TSP | PM10 | PM2.5 | sulfur dioxide content tower top mg/m$^3$ |
|---|---|---|---|---|---|---|---|---|---|
| dual alkali method pH > 13 | 40 | 41 | 0 | 4.4 | 2.4 | 6.67 | 6.66 | 6.29 | 89.16 |
| dual alkali method fan blades being added onto the spray heads | 38 | 38 | 2.17 | 0 | 1.6 | 1.05 | 0.99 | 0.81 | — |

Embodiment 8: Evaluation of Fire-Extinguishing Effect

Experiments are conducted according to the national fire-extinguishing standard of automatic water spray fire-extinguishing system (GB5135-2006): the wood pile has a size of 500*500*380 mm and consists of 10 layers of cedar wood that are oriented orthogonal to one another, wherein each layer has 5 strips that are evenly distributed and have a size of 38*38*500 mm. The wood pile is dried to a humidity of 6-12% and weighed. Then the wood pile is placed onto an oil tray made of steel, with a suitable water depth of >15 mm in the tray. Then 200 mL gasoline is poured into the tray. The spray head is placed at a height of 2.5 m directly above the wood pile. After initial burning for 2 min and the gasoline is burned out, the spray head is turned on. The experiment is kept for 10 min from ignition, and then the spray head is turned off. If the wood pile fire has not been extinguished at that time, it is carefully extinguished. Then, the burned wood pile is dried to a humidity of 6-12% and weighed, so as to calculate the mass loss. The change of PM10 and PM2.5 from before fire-extinguishing to after fire-extinguishing is monitored at a 6 m distance in the downwind direction. The results are shown in Table 14.

By using the three-nozzle jet flow rotary spray head (FIG. 2), the result of the first test is as follows: under 2-kilogram water pressure, the downward-spray extinguishing process of the wood flame that has burned for 2 minutes after ignition by 200 mL gasoline takes only 10 seconds and consumes a water amount of 6.25 L, the complete extinguishing of smoke takes 70 seconds, and the average mass loss of the wood pile is 8.6%.

By using the three-nozzle jet flow rotary spray head (FIG. 2), the result of the second test is as follows: under 2-kilogram water pressure, the downward-spray extinguishing process of the wood flame that has burned for 2 minutes after ignition by 200 mL gasoline takes only 8 seconds and consumes a water amount of 5 L, the complete extinguishing of smoke takes 70 seconds, and the average mass loss of the wood pile is 5.9%.

The above-mentioned wood pile fire extinguishing experiment is conducted by using the three-nozzle jet flow double-needle 45°-nozzle-angle atomizing spray head, and the test result is as follows: under 2-kilogram water pressure, the downward-spray extinguishing process of the wood flame that has burned for 2 minutes after ignition by 200 mL gasoline takes only 6 seconds and consumes a water amount of 3.75 L, the complete extinguishing of smoke takes 40 seconds, and the average mass loss of the wood pile is 6.4%.

The above-mentioned wood pile fire extinguishing experiment is conducted by using the watering spray head in prior art, and the test result is as follows: under 2-kilogram water pressure, the downward-spray extinguishing process of the wood flame that has burned for 2 minutes after ignition by 200 mL gasoline has not extinguished the fire after 10 min, consumes a water amount of 1626.1 L, and the average mass loss of the wood pile is 19.7%.

TABLE 14 fire-extinguishing effect of different types of rotary spray heads

| name | condition | PM2.5 (μg/m$^3$) | PM10 (μg/m$^3$) | wood loss | fire-extinguishing time: flame extinguished | smoke completely extinguished |
|---|---|---|---|---|---|---|
| three-nozzle jet flow rotary spray head | before fire-extinguishing | 825 | 1724 | 8.6% | 10 s | 1 min 10 s |
| | 1 min after fire-extinguishing | 505 | 1065 | | | |
| three-nozzle jet flow rotary spray head | before fire-extinguishing | 782 | 1576 | 5.9% | 8 s | 1 min 10 s |
| | 1 min after fire-extinguishing | 584 | 1292 | | | |
| three-nozzle jet flow double-needle 45°-nozzle-angle atomizing spray head | before fire-extinguishing | 753 | 1672 | 6.4% | 6 s | 40 s |
| | 1 min after fire-extinguishing | 309 | 629 | | | |

TABLE 14-continued

| fire-extinguishing effect of different types of rotary spray heads | | | | | | |
|---|---|---|---|---|---|---|
| | | | | | fire-extinguishing time | |
| name | condition | PM2.5 (μg/m$^3$) | PM10 (μg/m$^3$) | wood loss | flame extinguished | smoke completely extinguished |
| watering spray head (on the market) | before fire-extinguishing | 807 | 1741 | 19.7% | fire not extinguished after 10 min | |
| | 1 min after fire-extinguishing | 633 | 1520 | | | |

Figure 25:
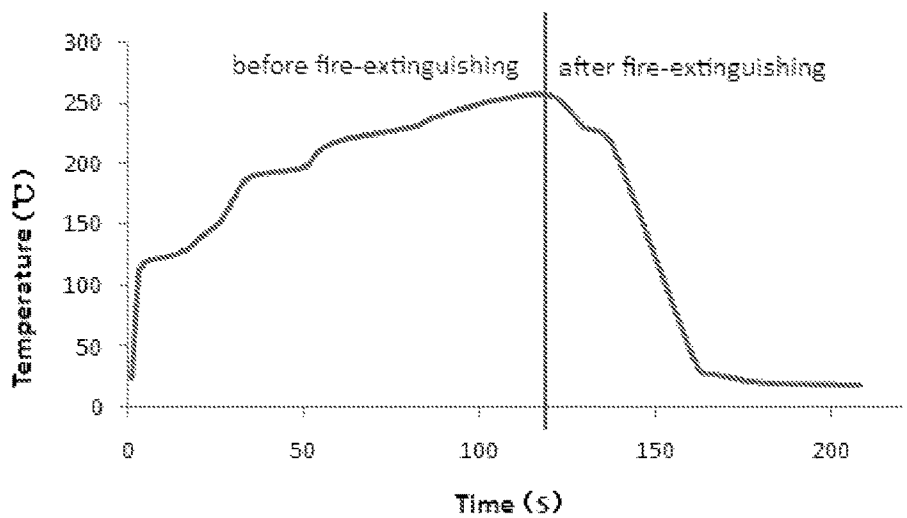
FIG. 25 shows temperature change before and after extinguishing a type-A fire with a hand-held bullet-shaped rotary spray head.

8.1 Fire-Extinguishing Experiment of Type-A Wood Pile Fire by Using a Hand-Held Bullet-Shaped Rotary Spray Head The above-mentioned wood pile and ignition method are used, 2 minutes after ignition, hand-held fire-extinguishing is performed by using a bullet-shaped rotary spray head under 3-kilogram water pressure. The spraying is started at a 1.8 m distance from the wood pile on the front side, then the spray head is move close to the wood pile and continuous spraying is directed towards the top and lateral sides. A thermocouple is placed at a 20 cm distance from the wood pile, so as to record the real-time temperature change. The test result is that, the extinguishing process of major flame takes only 10 s and consumes a water amount of 7.5 L, the complete extinguishing of smoke takes only 40 seconds and consumes a water amount of 30 L. The temperature measured by the thermocouple drops from 256° C. to 33° C. rapidly within 40 s after the spray head is turned on. The test result is shown in FIG. 25.

8.2 Fire-Extinguishing Experiment of Intensified Fire

The above-mentioned wood pile is used, 200 mL gasoline is added into an oil tray under the wood pile, and meanwhile 2 L gasoline is poured onto the wood pile. Fire-extinguishing is started at 10 s after ignition. A three-nozzle jet flow double-needle 45°-nozzle-angle atomizing spray head performs spraying at a height of 2.5 m directly above the wood pile. The burning is intense after ignition, and the flame reaches a height of over 3 m with thick smoke. After the spray head is turned on, it only takes 1 s to rapidly suppress the flame (with a water amount of 625 mL/s), the thick smoke quickly vanishes, the flame on the wood pile surface is extinguished after 5 s, the sporadic small fire inside the wood pile is completely extinguished after 40 s, with a total water consumption of only 25 L. After the water spraying is stopped, the wood pile has no smoke and does not reignite.

8.3 Fire-Extinguishing Experiment of Type-B Fire by Using a Hand-Held Three-Nozzle Jet Flow Double-Needle Atomizing Spray Head The type-B fire according to stipulation in the national standard GB4351-2005 is inflammable liquid fire. The experiment is conducted as follows: clear water with a height of 70 mm is placed into a round tray, then 1 L of 90# automobile gasoline is poured in. After initial burning for 10 s, fire-extinguishing is performed when the flame reaches a height of about 2 m. After fire-extinguishing is started, the height of the flame in the fire scene that has been covered is rapidly reduced, the water fog isolates the flame from the oil tray, and after about 12 s, the flame is completely extinguished, with a total water consumption of 7.5 L. After the fire is extinguished, the oil tray can be reignited for 5 times, which proves that, when a large amount of gasoline remains, a small amount of water that is atomized by this high-efficient rotary spray head is able to extinguish big fire of fuel oil.

Apparently, the aforementioned embodiments are merely examples illustrated for clearly describing the present invention, rather than limiting the implementation ways thereof. For those skilled in the art, various changes and modifications in other different forms can be made on the basis of the aforementioned description. It is unnecessary and impossible to exhaustively list all the implementation ways herein. However, any obvious changes or modifications derived from the aforementioned description are intended to be embraced within the protection scope of the present invention.

The invention claimed is:

1. An automatic high-speed rotary atomizing device, comprising a rotary spray head, characterized in that, the rotary spray head comprises:

an upper portion that is connected to pressurized fluid and is stationary; and a lower portion that is provided with one or more spray nozzles and is connected to the upper portion via a bearing, wherein, at least one spray nozzle of the one or more spray nozzles has a slanted surface with a curvature at an output end of the at least one spray nozzle and has a straight fluid transport channel body with a constant channel cross-sectional area and an axis that perpendicularly intersects the rotation axis of the lower portion of the rotary spray head at an input end of the at least one spray nozzle, and when the pressurized fluid is sprayed out from the output end of the at least one spray nozzle, part of the kinetic energy of the pressurized fluid generates a counterforce that propels the entire lower portion of the spray head to rotate at a high speed, and when the pressurized fluid is guided by the at least one spray nozzle, most of the kinetic energy of the pressurized fluid is converted into kinetic energy of the rotating spray nozzle and surface energy that facilitates atomization of the pressurized fluid, thereby forming high speed rotation of the spray nozzle and a large-scale atomized, dispersed and swirling system.

2. The automatic high-speed rotary atomizing device in accordance with claim 1, characterized in that, the rotary spray head comprises a spray nozzle, a rotary head, a bearing, a pipe joint, a fastener and a locating piece connected in sequence, the spray nozzle is fixed to the rotary head, the rotary head is connected to the bearing and the spray nozzle, the bearing is connected to the pipe joint, and the locating piece is arranged to locate the bearing in both the axial direction and the radial direction;

the spray nozzle and the rotary head are disposed on the lower portion, and the pipe joint is disposed on the upper portion.

3. The automatic high-speed rotary atomizing device in accordance with claim 2, characterized in that, the rotary spray head is connected to a fan blade or an impeller blade or a paddle blade.

4. The automatic high-speed rotary atomizing device in accordance with claim 3, characterized in that, the fan blade or impeller blade or paddle blade is provided with micro apertures.

5. The automatic high-speed rotary atomizing device in accordance with claim 2, characterized in that, the rotary head is in threaded or welded connection with the bearing and the spray nozzle;

the rotary head is provided with a flow passage bore therein and one or more openings or screw holes for being connected to the spray nozzle;

the bearing consists of one or more deep groove ball bearings, or the bearing consists of one or more deep groove ball bearings and axial thrust bearings.

6. The automatic high-speed rotary atomizing device in accordance with claim 5, characterized in that, the rotary spray head has a bullet shape, an olive shape, a round shape, a rectangular shape, a long column shape or a transverse tubular shape;

the spray nozzle consists of one or more nozzles for providing rotation, or consists of one or more nozzles for providing rotation and one or more top nozzles.

7. The automatic high-speed rotary atomizing device in accordance with claim 6, characterized in that, the sum of aperture the channel cross-sectional areas of the straight fluid transport channel bodies of the spray nozzles does not exceed the cross-sectional area of the flow passage bore within the rotary head.

8. The automatic high-speed rotary atomizing device in accordance with claim 6, characterized in that, the spray nozzle is a fine-pored spray nozzle, an atomizing nozzle, a small-flow jet nozzle or combination thereof.

9. The automatic high-speed rotary atomizing device in accordance with claim 1, characterized in that, the rotary spray head is a three-nozzle jet flow rotary spray head.

10. The automatic high-speed rotary atomizing device in accordance with claim 9, characterized in that, the three-nozzle jet flow rotary spray head is a three-nozzle jet flow double-needle atomizing spray head.

11. The automatic high-speed rotary atomizing device in accordance with claim 10, characterized in that, when the fluid is ejected from spray nozzles on both lateral sides of the three-nozzle jet flow double-needle atomizing spray head, the ejection direction of the fluid forms an intersection angle of 45° or 90° with the fluid transport channel axis of either of the spray nozzles on both lateral sides.

12. The automatic high-speed rotary atomizing device in accordance with claim 9, characterized in that, when the fluid is ejected from spray nozzles on both lateral sides of the three-nozzle jet flow rotary spray head, the ejection direction of the fluid forms an intersection angle of 45° or 90° with the fluid transport channel axis of either of the spray nozzles on both lateral sides.

13. Use of the automatic high-speed rotary atomizing device in accordance with claim 1, wherein, the rotary spray head is applied in a kettle, a tower or a tank individually or in combination, or the rotary spray head is connected on a pressurized fluid delivery pipe or a pressurized gas-water mixer, or the rotary spray head is positioned within a gas phase and/or a liquid phase.

14. The use of the automatic high-speed rotary atomizing device in accordance with claim 13, characterized in that, the automatic high-speed rotary atomizing device is positioned in a swirling purification tower, with the rotary spray head arranged adjacent to the flue gas inlet at the tower bottom for upward spraying or arranged at the middle section of the swirling purification tower.

15. The use of the automatic high-speed rotary atomizing device in accordance with claim 13, characterized in that, the rotary spray head is connected to a pump, a pressurized water storage container or pipeline to form a cooling humidification de-dusting apparatus, so as to perform local artificial intervention on the atmosphere to carry out atmospheric purification or artificial raining, to alleviate haze, and to eliminate smoke, dust and PM2.5 in a room, a yard, a residential district or a street.

16. A fire extinguishing method by using the automatic high-speed rotary atomizing device in accordance with claim 1, wherein, the rotary spray head is connected on an indoor stationary automatic water-spray fire extinguishing system, a mobile fire-fighting lance outlet, a portable fire extinguisher, a running water pipe web, a water pump, a pressurized gas-water mixing container, or a pressurized fluid delivery pipe.

17. The fire extinguishing method in accordance with claim 16, characterized in that, the rotary spray head is a three-nozzle jet flow rotary spray head, a three-nozzle jet flow double-needle atomizing spray head, a three-nozzle jet flow 45°-nozzle-angle double-needle atomizing spray head, or a bullet-shaped multi-nozzle jet flow rotary spray head.

* * * * *